United States Patent [19]

Loe, Jr.

[11] 4,038,531

[45] July 26, 1977

[54] PROCESS CONTROL APPARATUS FOR CONTROLLING A PARTICLEBOARD MANUFACTURING SYSTEM

[75] Inventor: Alton L. Loe, Jr., Tacoma, Wash.

[73] Assignee: Weyerhaeuser Company, Tacoma, Wash.

[21] Appl. No.: 687,452

[22] Filed: May 18, 1976

[51] Int. Cl.[2] ........................ B29J 5/00; G05B 17/02; G05B 13/02

[52] U.S. Cl. .............................. 235/151.1; 235/150.1; 156/360; 198/505; 141/83; 177/25; 177/121; 425/140; 425/148

[58] Field of Search ............... 235/151.1; 177/25, 121; 156/360; 222/55, 77; 425/140, 148

[56] References Cited

U.S. PATENT DOCUMENTS

| | | | |
|---|---|---|---|
| 3,165,195 | 1/1965 | Sass et al. | 177/121 X |
| 3,303,967 | 2/1967 | Munson | 222/55 X |
| 3,779,843 | 12/1973 | Knapp | 156/360 |
| 3,833,693 | 9/1974 | Ross | 425/148 X |
| 3,845,287 | 10/1974 | Fremont et al. | 235/151.1 |
| 3,868,643 | 2/1975 | Bullivant | 222/55 X |
| 3,989,935 | 11/1976 | Fay | 235/151.1 |

*Primary Examiner*—Eugene G. Botz
*Attorney, Agent, or Firm*—Christensen, O'Connor, Garrison & Havelka

[57] ABSTRACT

An improved particleboard manufacturing system wherein the weight of each mat for forming a particleboard is continuously monitored and controlled by a process controller as the mats are formed on a moving conveyor. The actual weight of each mat is determined and utilized by the process controller to selectively control the speed of the conveyor and the rate at which wood particles are deposited by a series of formers that are located along the conveyor system to thereby control the weight of mats currently being produced. The process controller includes a control system for continuously controlling mat weight by supplying former speed control signals that are related to a predicted weight error signal, developed within the control system, and a measured weight error signal equal to the difference between a desired or target weight and the actual weight of each mat. A signal, equal to the difference between the measured error and the predicted error, is conditioned by a transfer function unit to supply a signal suitable for driving each former of the particle board manufacturing system. To provide a near optimal control system, the signal conditioning supplied by the transfer function unit is adaptively tuned on the basis of the measured weight error. A second control system is included in the process controller to provide automatic mat weight control whenever the system operator changes the production rate by altering the speed of the conveyor system. During such changes in production rate, this control system modifies the former speed based on changes in conveyor speed. A third control system, contained within the process controller, permits the controlled particleboard manufacturing system to be efficiently changed from the production of one grade of particleboard to another grade while minimizing the number of unacceptable mats that are produced. The process controller also includes a fourth control system that allows the controlled particleboard manufacturing system to be reactivated after a brief interruption in production without producing a large number of mats of an unacceptable weight.

21 Claims, 9 Drawing Figures

PROCESS CONTROL APPARATUS FOR CONTROLLING A PARTICLEBOARD MANUFACTURING SYSTEM

BACKGROUND OF THE INVENTION

In one type of commonly used particleboard manufacturing system, a moving conveyor continuously transports flat metal plates known as cauls past a series of formers which are supplied with wood particles that are impregnated with resin and wax. The formers deposit the wood particles on the moving cauls at a rate which is determined by two motor driven devices within each former, with the speed of each motor driven device being controllable by electrical signals. As the wood particles are deposited, the particles loosely adhere to one another and form a web that is automatically trimmed to form a mat of desired length and width as the cauls pass from beneath the formers.

As in all particleboard manufacturing systems, the weight of each mat determines some of the more important characteristics of the finished particleboard that is formed from that mat. Hence, there exists an acceptable weight range for each type and thickness of particleboard that is produced. Since the volume of the deposited wood particles, and hence the mat weight, is inversely proportional to the speed of the conveyor and is directly proportional to the rate at which the formers deposit the wood particles, it has long been the practice within the prior art to manually control each of the former speeds (rate at which the formers deposit wood particles) and to manually control the conveyor speed in an attempt to continuously produce mats of an acceptable weight.

Such manual control has not resulted in the efficient manufacture of particleboard largely because of the wide variation in density of the wood particles employed in the process. One reason for this variation in wood particle density is that a variety of different woods may be used with the types of wood or the mixture of different woods being determined by the type of wood available at any given time. Further, even in situations in which a single type of wood is utilized, variations in wood particle density are encountered. In addition, the density of the wood particles is further affected by conditions such as the moisture content of the wood particles, variations in the specific density of the resin being employed, and the ambient humidity and temperature. Thus, it can be recognized that rather abrupt changes in wood particle density can occur at any time and that each such disturbance to the manufacturing process necessitates prompt control action to maintain the weight of the mats being produced within the acceptable limits.

Manual control to compensate for disturbances in the particleboard manufacturing system is hindered by the fact that the weight of a particular mat is only known after several other mats have been deposited by the formers. This condition arises since the apparatus for forming the length of each mat is generally located between the last former and a scale upon which each mat is weighed as it passes to a press located at the terminus of the conveyor system. Thus, it can be appreciated that the system operator is not aware of a disturbance such as an abrupt change in wood particle density until a number of mats have been formed. Further, when the operator initiates a change in one or more former speeds and/or a change in the conveyor speed, the effect of this action cannot be observed until an empty caul passes beneath the formers and reaches the scale. Thus, even the most experienced and proficient operator of a prior art particleboard manufacturing system is not able to control the manufacturing system so as to achieve highly efficient production.

The problem of manually controlling the particleboard manufacturing system is further complicated in that several situations arise in which it is necessary to change the conveyor speed and/or the former speeds. First, in most particleboard manufacturing systems it is necessary to periodically set the conveyor speed to achieve a desired production rate. In order to continue producing mats of an acceptable weight during such a change in production rate, the operator must manually adjust the conveyor while adjusting the former speeds (either simultaneously of alternately effecting small changes in conveyor speed and former speeds) to continue producing acceptable mats. As in the case of continuously controlling mat weight at a single production rate, even the most proficient and experienced operator is often hard pressed to effect a desired change in production rate without producing a substantial number of unacceptable mats.

Another situation that arises to complicate the manual control of a prior art particleboard manufacturing system is changing from the production of one grade of particleboard to the production of another grade. Since each grade or type of particleboard can require a different mat length and a different mat width and each grade includes finished particleboard of various thickness, changing from the manufacture of one grade to the manufacture of another grade can call for substantial adjustment of the conveyor speed and each former speed. The grade change situation is further complicated in that in order to change the length and/or width of the mats being produced, the operator must make certain mechanical adjustments to other apparatus within the particleboard manufacturing system. Further, when a change is made to begin manufacturing a different type of particleboard, the operator will often be required to also adjust the rate at which the new grade of particleboard is being produced. Hence, with respect to prior art particleboard manufacturing systems, changing from the production of one grade of particleboard to the production of another grade generally produces a substantial number of unacceptable mats.

One further condition that arises to hinder efficient operation of a prior art particleboard manufacturing system occurs when there is a short interruption in the operation of the manufacturing system. Such an interruption can occur, for example, when the manufacturing system must be shut down for a short interval to perform maintenance duties, or a power interruption occurs. The problem presented by such a production interruption arises because the wood particles contained within the formers begin to lose moisture content and hence effectively become less dense. When production is resumed, such wood particles pass more readily from the formers and unless the former speeds are adjusted, the weight of each mat will increase above that being produced when the shutdown commenced. Since the decrease in moisture content is dependent on the duration of the shutdown, the moisture content of the wood particles prior to the shutdown, and is also dependent on other factors such as the ambient temperature and humidity, it is difficult for the system operator to manually adjust the former speeds to properly compensate for this condition. Further, since the moisture content of the wood particles will generally increase once the supply of particles held within the formers during the production interruption is exhausted, the operator will again be called upon to adjust the former speeds.

Thus, it can be seen that the production of particleboard with a prior art manually controlled manufacturing system does not provide efficient operation. Such inefficient operation increases the cost of manufacturing particleboard in that it requires more time than should be necessary to produce a given quantity of mats. Further, this inefficient operation increases manufacturing costs in that a considerable amount of time, effort, and equipment may be necessary if the material within the rejected mats is to be salvaged.

There is yet one other practice in the prior art particleboard manufacturing process that contributes to the overall inefficiency of a particleboard manufacturing system. This practice is the method of determining the weight of each mat by weighing both the mat and the caul upon which the mat is formed and simply deducing a nominal caul weight to determine the weight of the mat.

Since the cauls wear rather rapidly during usage, the weight of each caul is continually being reduced. Thus, in some cases, a mat that is actually within the desired weight range may be rejected because the weight of a particular caul does not closely correspond to the weight presently being attributed to each caul. Further, since the cauls do not each wear at the same rate, production must be periodically interrupted and the cauls calibrated to reference the weight of each caul to a standard weight (normally the lightest caul). This calibration technique not only requires an interruption in production but also causes the cauls to become a "matched set". Because of this, it has become common practice to replace all the cauls as soon as a number of cauls develop cracks or become rather worn. Thus, the overall efficiency of the particleboard manufacturing system is decreased and the cost of manufacturing particleboard is increased due to loss production time while the cauls are being calibrated, the rejection of a number of mats which actually lie within the acceptable weight range, and the replacement of the cauls when a number of the cauls are still usable.

Accordingly, it is an object of this invention to provide apparatus for determining the actual weight of each mat wherein the cauls do not require periodic weight calibration.

It is another object of this invention to provide a manufacturing system for producing particleboard wherein the manufacturing system is cntinuously controlled to produce mats within an acceptable weight range.

It is yet another object of this invention to provide a process controller for continuously controlling a particleboard manufacturing system wherein the actual weight of each mat is determined to enable the process controller to accurately control the weight of each mat being produced.

It is still another object of this invention to provide a process controller for continuously controlling the weight of mats being produced within a particleboard manufacturing system during a period of time in which the production rate of the system is being changed.

It is a still further object of this invention to provide a process controller for controlling the weight of the mats produced within a particleboard manufacturing system when the grade of particleboard being produced is changed from one particular grade to another.

Even further, it is an object of this invention to provide a process controller for controlling the weight of the mats produce within a particleboard manufacturing system when system operation is commenced after an interruption in the operation of the manufacturing system.

Further yet, it is an object of this invention to provide a process controller for controlling the weight of mats produced within a particleboard manufacturing system wherein the controller provides automatic mat weight control to compensate for variations in the density of wood particles employed during continued operation of the system, to compensate for variations in wood particle density caused by a period of suspended operation of the manufacturing system and further provides for automatic weight control during changes in the system production rate and during changes from the manufacture of one grade of particleboard to another grade.

SUMMARY OF THE INVENTION

These and other objects are achieved in accordance with this invention by a process controller that reacts to compensate for system disturbances such as changes in wood particle density that occur durng continued operation of the system, reacts to compensate for changes in wood particle density caused by a period of suspended operation of the particleboard manufacturing system, and further reacts to provide automatic weight control during changes in the system production rate and during changes from the production of one grade of particleboard to another grade of particleboard.

The process controller effects control of the mat weight during normal continued operation of the particleboard manufacturing system by a feedback control system in which the difference between the mat target weight and the weight of each mat (measured error) is combined with a predicted error (supplied by the mat weight control system) to provide a signal for controlling each former speed in a manner which causes the actual mat weight to converge toward the target mat weight (and hence causes the measured error to converge toward zero).

The predicted error is supplied by what is known in the field of control engineering as the model reference technique. In the model reference technique an electrical analog of the physical system being controlled continually supplies a prediction signal representing the physical results that should be obtained within the controlled system. In this invention, the circuit producing the predicted error is continually updated to correspond to each mat produced by the particleboard manufacturing system so that the control signal supplied by the mat weight control system constantly causes changes in the former speeds that improve the actual mat weight.

In accordance with this invention, the difference signal between the measured error of each mat reaching the gross scale and the predicted error for that particular mat is conditioned by a transfer function unit to provide a signal for driving conventional prior art formers. Preferably, in accordance with this invention, the response of the transfer function unit is adaptively controlled based on the measured error of each mat passing the gross scale. Adaptively controlling the response of the transfer function unit provides near optimal performance of the mat weight control system in that the transfer function unit can be arranged to provide extremely rapid control of each former speed to correct the type of disturbances normally encountered in the particleboard manufacturing system and still control mat weight when more significant disturbances are encountered.

With respect to controlling the weight of the mats when the production rate of the particleboard manufacturing system is changed, the process controller of this invention causes a constant rate of change in the manufacturing system conveyor speed whenever the speed necessary to achieve the desired production rate exceeds the production rate that will be effected by the control signal currently being supplied to the system conveyor. To maintain the mat weights within the acceptable limits during the production rate change, the process controller effectively determines the ratio of the conveyor speed control signal being presently supplied and the speed control signal supplied at a predetermined earlier time and adjusts each former speed in proportion to this ratio.

To automatically control mat weight during a change from the production of one grade of particleboard to another grade, the process controller of this invention supplies an appropriate conveyor control signal that is proportional to the present conveyor speed and is also proportional to the length, width and target weight of that particleboard presently being produced and the length, width and target weight of the particleboard to be produced. In this manner, the conveyor speed of the manufacturing system is adjusted to supply mats of the new grade of particleboard that are within the desired weight range. When the conveyor system has been so regulated, the system operator is then able to initiate a production rate change to establish the particleboard manufacturing system at the desired production rate for the new grade of particleboard.

To automatically control the particleboard manufacturing system to compensate for mat weight changes due to an interruption in the operation of the particleboard manufacturing system, the process controller of this invention adjusts each former speed based on the amount of time the manufacturing system has been out of operation. Since certain factors other than the period of time that the system has been deactivated have a rather unpredictable effect on the amount of former speed change that will be required, the former speed control for shutdown compensation is adaptively modified based on the measured mat weight errors that occurred following a previous production interruption.

The preferred embodiments of this invention include a mat weighing unit for determining the actual weight of each mat produced by the particleboard manufacturing system. This mat weighing includes a caul scale positioned between the apparatus that supplies cauls to the conveyor of the manufacturing system and the first former for depositing wood particles on the moving cauls. As each caul moves over the caul scale a digital signal proportional to the weight of the caul is coupled to the mat weighing unit. When a particular caul and the mat contained thereon reach the scal utilized within the prior art to determine the gross weight of the caul and the mat, a digital number representative of the gross weight is coupled to the mat weighing unit. The mat weighing unit includes means for referencing a paritcular caul reaching the gross weight scale to the weight obtained when that particular caul past the caul scale. The mat weight unit also includes means for subtracting the caul weight from the gross weight to obtain the actual weight of each mat arriving at the gross scale and further includes means for determining whether this actual mat weight is within the desired mat weight limits. To determine if each mat is within the desired acceptable limits, the mat weighing unit includes means for subtracting the actual mat weight from a preselected target weight and compares the difference between the target weight and the actual mat weight with a preselected acceptable weight deviation. If the mat weight is within the acceptable limits, the mat weighing unit allows the mat to continue through the system to become a finished particleboard. If the actual weight of the mat is not within the acceptable limits, the mat weighing unit signals the manufacturing system to reject the mat and the mat is not allowed to continue through the manufacturing process.

DETAILED DESCRIPTION

Figure 1:
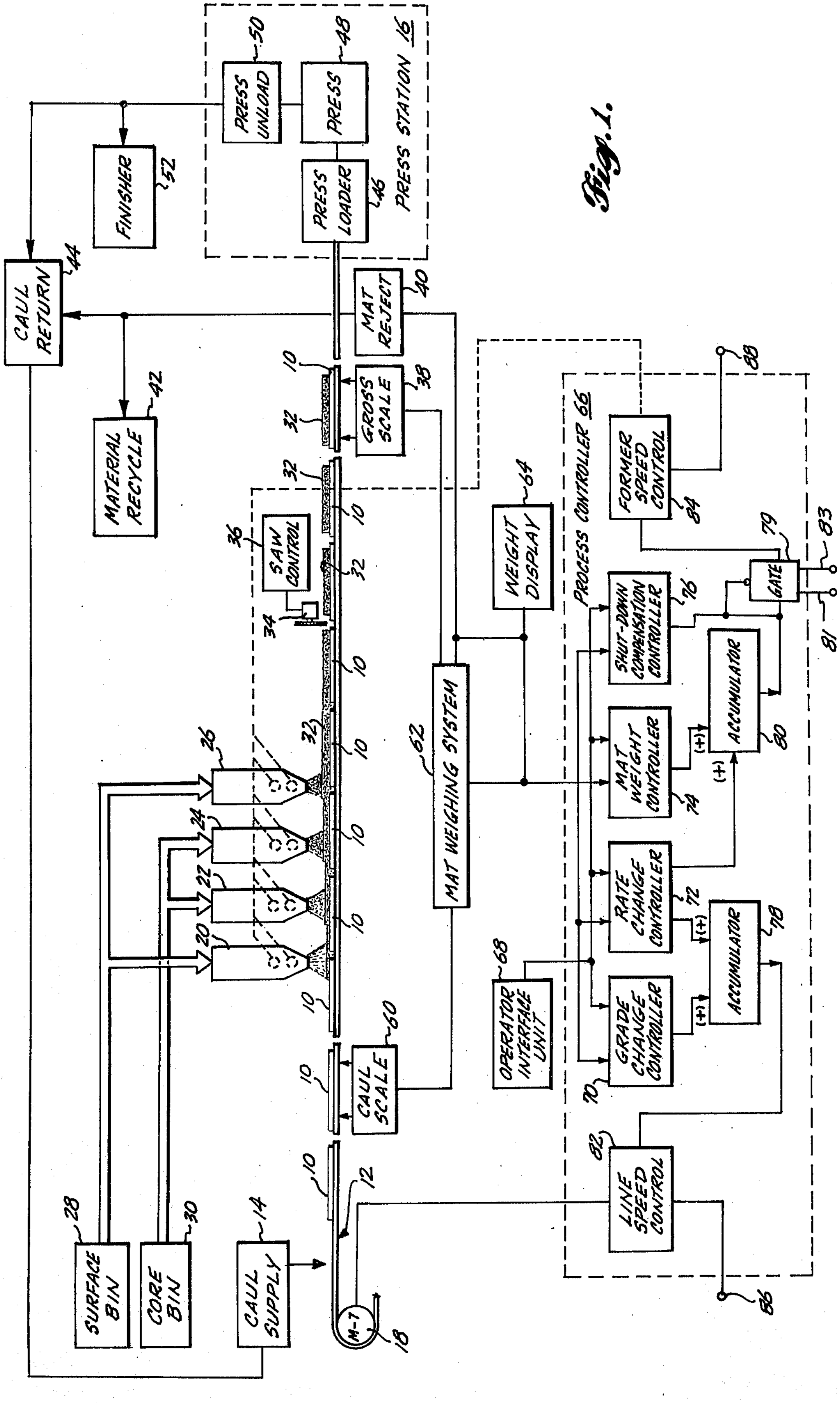
FIG. 1 diagrammatically illustrates a particleboard manufacturing system that includes a mat weighing unit and a process controller in accordance with this invention.

FIG. 1 depicts the basic configuration of a particleboard manufacturing system in accordance with this invention. In FIG. 1, cauls 10 are supplied to a conveyor system 12 from a caul supply station 14. The conveyor system 12 and the caul supply station 14 are conventional elements known in the art of particleboard manufacturing that are arranged to continuously move cauls from the supply station 14 to a press station 16. In the system of FIG. 1, a single motor 18 is depicted as driving the conveyor system 12, although in practice several motors may be used to drive various portions of the conveyor system.

As each caul 10 moves along the conveyor 12, comminuted wood or other fibrous material, impregnated with a bonding agent such as a resin, is deposited on the cauls 10 by a series of formers. In FIG. 1, four formers 20, 22, 24 and 26 are depicted, although various numbers can be employed. Regardless of the number of formers utilized, each caul 10 first passes under one or more formers that deposit a layer of resin impregnated wood particles that will form a relatively high quality surface layer on the completed particleboard. In FIG. 1, this surface layer is deposited by the former 20 which is a conventional former that is continuously fed a supply of appropriate material from a surface bin 28 in a manner known to the art.

As each caul 10 passes from beneath the formers that deposit the surface layer, one or more formers deposit a layer of somewhat lower quality impregnated wood particles that will form a core layer within the completed particleboard. In the system of FIG. 1, this core layer material is deposited on the cauls 10 by the formers 22 and 24, each of which are supplied material from a core bin 30. As the cauls 10 pass from the beneath the formers for depositing the core layer, a second surface layer is deposited by one or more formers supplied from the surface bin 28, e.g., former 26 of the system illustrated in FIG. 1.

As the resin impregnated wood particles are deposited on the cauls, the particles adhere to one another to form a web or mat (32, in FIG. 1) having a thickness substantially greater than that of the finished particleboard. In view of the described operation, it can be seen that the amount of material deposited — and hence both the thickness and weight of the mat 32 — is directly related to the volume of wood particles deposited by the formers 20–26 and is inversely related to the speed of the conveyor system 12. With respect to the volume of material passing from the formers 20–26, conventinal formers generally include two sets of motor driven rollers or other apparatus to control the amount of material within the exit region of the former and to control the amount of material passing from the former. Within the art, the rate at which material flows from each former is controlled by two controls generally called the master former speed and the follower former speed with the two speeds being normalized to the maximum speed attainable. Hence, the master and follower speeds are normally stated in terms of "percent", a convention which shall be adhered to herein.

As the cauls 10 pass beneath the formers (e.g., formers 20–26 in FIG. 1), the mat 32 is trimmed to a desired width by a series of wipers or other conventional devices (not shown in FIG. 1) and the excess material is automatically swept from the surface of the caul 10. Each caul 10 then passes beneath a cut-off saw 34 that is activated by a saw control unit 36 to trim the mat to a desired length. As the saw 34 trims the mat 32, the excess material is removed from the caul 10 so that a substantially rectangular mat 32 of a desired length and width remains on the surface of each caul 10.

Next, the cauls 10 pass to a gross weight scale 38 for determining the combined weight of each caul 10 and the mat 32. The gross weight scale is a conventinal element of a particleboard manufacturing system that often includes means for determining whether the combined weight of caul 10 and mat 32 are within an acceptable weight range.

Since th density of the finished particleboard largely determines such important properties such as the strength of the board, its screw holding resistance, and water absorption characteristics, the mat weight is an important control parameter in the operation of a particleboard manufacturing system. In fact, it has been determined within the art that a mat 32 can be accepted for further processing or rejected and removed from the manufacturing process solely on the basis of the mat weight.

In this respect, prior art particleboard manufacturing systems have attempted to determine the mat weight by utilizing cauls that are maintained within a certain weight range and adjusting the gross weight scale 38 to compensate for the average caul weight. Although this method of operation is fairly satisfactory, the continual passage of the cauls along the conveyor system 12 and through the press station 16 causes the cauls to wear rather rapdily. Since this wear causes a weight loss that is not uniform from one caul to another, it has been necessary within the prior art to periodically calibrate the weight of the cauls 10. Generally, this is accomplished by removing the cauls 10 from operation, weighing each caul and encoding the lighter cauls with one or more openings outside the surface area that supports the mats 32 to indicate the weight difference between the encoded caul and the heaviest caul. These openings are generally detected by an optical reader included within the gross scale 38 to compensate the gross scale reading for that particular caul 10.

This calibration technique not only requires a considerable amount of time and effort, but also causes the cauls being used to more or less become a calibrated or matched set. Thus, when some of the cauls begin to crack or are damaged in other ways, it has become an established practice to replace all of the cauls rather than replace only those that have become damaged. As shall be described hereinafter, one of the features of the preferred embodiments of this invention is that the weight of each mat 32 is determined by first weighing a caul prior to the deposition of the resin impregnated wood particles that form the mat 32, and automatically determining the actual weight of each mat 32 by determining the difference between the gross weight measurement and the caul weight measurement. This not only eliminates the prior art calibration requirement, but also improves the accuracy of the system while simultaneously extending the useful life of the cauls and eliminating the need for optical reading within the gross scale 38.

Regardless of whether the weight of the mat 32 is determined by the prior art method which effectively makes allowance for an average caul weight, or in accordance with this invention, by an actual weight determination, the mat 32 is accepted for further processing only if the mat weight falls within a predetermined range. In FIG. 1, a mat rejection station 40 includes means for removing a caul 10 and mat 32 from the conveyor 12 with the wood particles forming the mat 32 being sent to a material recycling mechnism 42 and the caul 10 being moved to a caul return mechanism 44 which moves empty cauls back to the caul supply 14.

Conventional gross scales 38, mat rejection apparatus 40, material recycle apparatus 42, and caul return apparatus 44 are well known in the art. Generally, the gross scale 38 is an isolated portion of the conveyor system 12 wherein the speed at which the cauls 10 move toward the press station 16 is increased to physically separate the cauls from one another to allow sufficient time for the weighing operation. As the weighing operation is complete, each caul 10 bearing a mat 32 is generally moved directly from the gross scale 38 to either the material recycle apparatus 42 where the wood particles are swept from the caul, or is moved forward on the conveyor system 12 to the press station 16 for the completion of the manufacturing operation.

The press station 16 is a conventinal portion of the manufacturing system wherein the mat bearing cauls are accumulated for loading into a press (e.g., by press loader 46 of FIG. 1); placed under pressure and elevated temperature for a predetermined period of time, e.g., by the press 48; and, unloaded and cooled, e.g., by press unloader 50. As the formed particleboards are taken from the unloader 50, the particleboard is passed to a finishing station 52 where the surfaces of the particleboard are sanded smooth and the boards are cut to smaller dimensions. The empty cauls 10 are routed to the caul return 44 for return to the caul supply 14.

As was previously stated, the weight of a mat 32 is an important parameter that is used to determine whether a particular mat is suitable for passing into the press 16 for forming into a finished particleboard. Thus, for each type of particleboard manufactured, commonly called a "grade" of particleboard, having a predetermined length, width and finished thickness there exists an acceptable weight range or weight deviation. In view of this, and in view of the above-described manufacturing system, it will be realized that if the specific density of the resin impregnated woood particles remain constant then each size of each grade of particleboard could be satisfactorily manufactured with a certain conveyor speed and certain master and follower former speeds. This however is not the situation and the specific density of the wood particles that form both the core and surface layers vary over a wide range. One source of this variation is the particular type of wood particle being employed at any given time, with factors such as original moisture content of the wood particles and ambient humidity further influencing the specific density of the wood particles. In fact, the specific density of the material not only varies on a long term basis (i.e., day to day, month to month), but can change rather abruptly at any time during the manufacture of a particular grade of particleboard.

In the prior art, adjustment of the conveyor speed and the master and follower speeds of each former to control the weight of the mat has been performed by the system operator on essentially a guess-work basis. That is, as the cauls 10 pass over the gross weight scale 38, the operator observes whether the scale indication is within the acceptable range and takes action based on his observations. If the gross weight is outside of, or dangerously near the acceptable limits, the operator can activate a set of controls to increase or decrease each master and follower speed of each of the formers and increase or decrease the speed of the conveyor system. Due to the time lag that occurs before the operator can detect an out of tolerance mat and the time lag that occurs before the operator can observe the effect of the corrective action he has taken, this method of operation has not been entirely satisfactory. That is, if a change in wood particle density causes the weight of a mat 32 to be outside the acceptable range, the operator is not aware of the change until the mat 32 and caul 10 containing the mat reach the gross weight scale 38, a time at which the formers 20–26 have already deposited mats 32 on a significant number of other cauls 10. For example, six cauls may be typically moving along the conveyor 12 between the first surface former 20 and the gross scale 38.

Even if the operator promptly initiates corrective action, the operator will not observe whether the proper action has been taken until these six cauls pass by the gross scale 38 and mats 32 that has not reached the former 20 at the time the action was taken begin to arrive at the gross scale 38. Of course, if the corrective action was not a proper one, more corrective action must be taken and mats 32 that may be outside the acceptable weight range continue to pass from the final surface former 26 and the rejected at the mat rejection station 40. Thus, satisfactory operation of the manufacturing system depends greatly on the experience and skill of the operator so that proper corrective action is promptly initiated. Even with the most skilled operator, the physical constraints imposed by the rather rapid and unpredictable changes in the density of the wood particles result in a significant number of rejected mats.

The operation of a particleboard manufacturing system as described at this point is further complicated in that such systems must generally be capable of being set to a predetermined production rate and capable of manufacturing various thickness of various grades of particleboard. Thus to achieve satisfactory operation while manufacturing a particular thickness of one grade of particleboard, the operator must be able to control mat weight while simultaneously achieving a desired production rate. Further, the operator must be able to quickly reset the conveyor and former speeds to begin the manufacture of another grade and thickness of particleboard at the same or some other production rate. In addition, often times the manufacturing system must be shut down for some reason or another for a brief period of time. When the occurs, the moisture content of the wood particles within the formers 20–26 begins to decrease, causing the wood particles to effectively become less dense. When the production system is again activated, a larger volume of wood particles passes from the formers than passed from the formers prior to the shut down time and the weight of the mats 32 increases. Hence, again the system operator must rely on his experience to decrease the former speeds and/or line speed of the conveyor 12 a sufficient amount of compensate for this density change. Since the drying process is related to the type of wood being used, the original moisture content and the ambient temperature and humidity, even the most experienced operator has difficulty in rapidly determining the proper corrective action. Further, as wood particles arrive in the formers that were not subjected to the moisture loss, the mat weight begins to decrease again and the operator must take the proper corrective action. Accordingly, it can be recognized that reasonable efficient operation of a particleboard manufacturing system has been heretofore extremely difficult to achieve and a great many mats are often rejected.

As shall be described hereinafter, this invention is an improvement on the type of prior art manufacturing system that comprises the system elements described above. In particular, this invention provides for an accurate determination of the actual weight of each mat 32 and provides for continuously controlling the weight of the mats 32 during the manufacture of a particular grade of particleboard, during changes in production rate, during changes from one grade of particleboard to another, and when the manufacturing system is activated after a shutdown period. As shall be described hereinafter, this control is effected by a feedback control system which predicts weight changes in the mats presently being deposited on the cauls 10 by the formers 20–26 and initiates a control action based on the predicted weight changes and the actual weight of mats presently passing over the gross scale 38. In addition, the control system of this invention adaptively modifies the control action based on control parameters such as the weight difference between a mat on the gross scale and the desired or target weight.

Referring again to FIG. 1, the control system of this invention includes a caul scale 60 located along the conveyor 12 at a position between the caul supply 14 and the first former 20. The caul scale 60 is a conventional scale such as the gross scale 38, having a digital output signal with the scale 60 generally being installed on the conveyor system 12 in the same manner as the gross scale 38.

The output signals of the caul scale 60 and the output signal of the gross scale 38 are each coupled to a mat weighing system 62. Since a number of other cauls 10 are located between the caul scale 60 and the gross scale 38, several cauls will arrive at the gross scale during the period of time it takes a particular caul to travel between the caul scale 60 and the gross scale 38. Thus, to accurately determine the weight of each particular mat 32, the mat weighing system 62 includes means for correlating each signal supplied by the gross scale 38 with the signal supplied by the caul scale 60 when that same caul 10 passed over the caul scale 60. The mat weighing system 62 then determines the difference between these signals to detect the actual weight of the mat 32 then passing over the gross scale 38. This weight is then compared with the target weight to determine if the mat 32 is within the acceptable weight limits and the mat weight system 62 supplies an appropriate control signal to the mat rejection 40 to either allow the mat 32 to continue to the press station 16, or send the mat 32 and the supporting caul 10 to the material recycle station 42 and the caul return 44.

As the actual weight of each mat 32 is determined, the actual weight signal and the rejection control signal are coupled to a weight unit 64. The weight display unit 64 can be any conventional display apparatus arranged to display the mat weight and acceptance status to the operator. For example, digital meters can be used to supply the mat weight and/or the weight deviation from the mat target weight and a "go-no-go" indicator such as an incandescent lamp or an audible alarm can be used to indicate the rejection of a particular mat. In any case, the weight of each mat 32 is automatically determined and the manufacturing system automatically activated to reject nonconforming mats.

In accordance with this invention, the weight of each mat 32 is automatically controlled by a process controller 66 during normal system operation, during a change in particleboard production rate, during a change from the manufacture of a particular grade of particleboard to another grade of particleboard, and when the system is reactivated following a shutdown period. In FIG. 1, control parameters such as the target weight, the desired grade and thickness, and the desired production rate are entered by the operator on an operator interface unit 68 and coupled to the process controller 66.

The interface unit 68 can be variously configured to include a variety of conventional interface components for supplying digital signals that represent each of the entered control parameters. For example, the interface unit 68 can include a conventional keyboard that supplies digitally encoded electrical signals or can include a number of switches for digitally encoding a series of conductors that are connected to the processor 66. In addition, the interface unit 68 can include a conventional display device such as a cathode ray tube and associated circuitry for displaying various information to the operator. For example, if necessary or desirable, the process controller 66 can include means for determining the changes in mat weight or deviation from the target weight over a period of time such as an hour or the elapsed portion of a particular work shift, with the display device within the interface unit 68 being adapted to display these changes as a trend diagram.

Regardless of the configuration of the interface unit 68, the desired control parameters are coupled to a grade change controller 70, a production rate change controller 72, a mat weight controller 74, and a shutdown compensation controller 76. As shall be described hereinafter, each controller 70, 72, 74 and 76 is configured to change the line speed of the conveyor 12 and/or the master and follower speeds of the formers 20, 22 24 and 26 to cause the weight of the mats 32 to remain within acceptable limits, or if the system is disturbed such that the weight of one or more mats is outside the acceptable limits, to cause the system to rapidly begin producing acceptable mats.

Although it will be recognized upon understanding the operation of the system depicted in FIG. 1 that former speeds and line speed can be controlled in various manners and combinations to effect the desired weight control, the arrangement depicted in FIG. 1 utilizes control of each master and follower former speed to effect shutdown compensation and continuously control mat weight during normal operating periods. Additionally, in the system of FIG. 1, the grade change controller 70 provides signals to cause a change in line speed without changing the master and follower former speeds, and the rate change controller 72 supplies signals to change both line speed and each former speed.

Each signal produced by the controllers 70, 72 and 74 is coupled to an appropriate accumulator 78 or 80. The accumulator 78 adds any incoming signals from the grade change controller 70 or rate change controller 72 to supply a signal that is equal to the sum of the incoming control signal and the output signal of accumulator 78 prior to the arrival of the incoming signal. In a like manner, the accumulator 80 receives control signals from the rate change controller 72 and the mat weight controller 74. These incoming signals are summed with the signal stored within the accumulator 80 prior to the arrival of a control signal to supply a signal for increasing or decreasing the amount of wood particles deposited by the formers. Accumulators such as accumulators 78 and 80 are known in the art and comprise various means for delaying the digital signal stored within the accumulator by one "unit delay" and adding the delayed signal to the next incoming digital signal. For example, with respect to the mat weight controller 74 the unit delay is the time that elapses between a particular mat 32 reaching the gross scale 38 and the arrival of the next mat. As each mat 32 arrives at the gross scale 38, the mat weight controller 74 determines whether a change in former speed is necessary to adjust the weight of mats 32 and accumulates this signal with the previous former speed control signal stored within accumulator 80.

As shall be described with reference to the shutdown compensation controller of FIG. 9, the signal supplied by the shutdown compensation controller 76 is coupled to a gate circuit 79. Gate circuit 79 is a conventional digital switching device such as an addressable data port that is arranged to couple the output signal of the shutdown compensation controller 76 to a former speed control 84 whenever an appropriate logic signal is applied to the terminal 81 of the gate 79. The output signal supplied by the accumulator 80 is coupled to a second input of the gate 79 for coupling to the former speed control 84 whenever the logic signal is not applied to terminal 81 of the gate 79.

The output signals of the line speed accumulator is coupled to a line speed control 82 and, as described above, the output signals of the former speed accumulator 80 is coupled to a former speed control 84 via the gate 79. With respect to controlling the master and follower speeds of each former 20, 22, 24 and 26 it should be noted that a separate former speed accumulator 80, a separate gate 79, and a separate former speed control 84 is associated with each master and each follower speed of each of the formers. Thus in the system of FIG. 1, eight accumulators 80, eight gates 79, and eight former speed controls 84 are generally employed to permit separate control of each master and follower former speed. Although other embodiments of the invention are possible wherein each former speed is not separately controlled, separate control is preferable in that more optimum control of mat weight is thereby effected.

In any case, the signal supplied by each former speed control 84 is connected to the associated master or follower of the formers 20, 22, 24 and 26 to control the rate at which wood particles are deposited and hence control the weight of the mats 32. Similarly, the signal supplied by the line speed control 82 is coupled to the motor 18 to control the speed of the conveyor 12 therefore controlling both the production rate and the weight of the mats 32.

Generally, in the practice of this invention, a manual speed control is also provided to manually control the line speed and the former speed whenever it is desired or necessary. As shall be described in more detail hereinafter, the manual control of line speed is effected by applying a pulse signal to a manual line speed control terminal 86 and the manual control of each former speed is effected by applying a pulse signal to a former speed control terminal 88.

Figure 2:
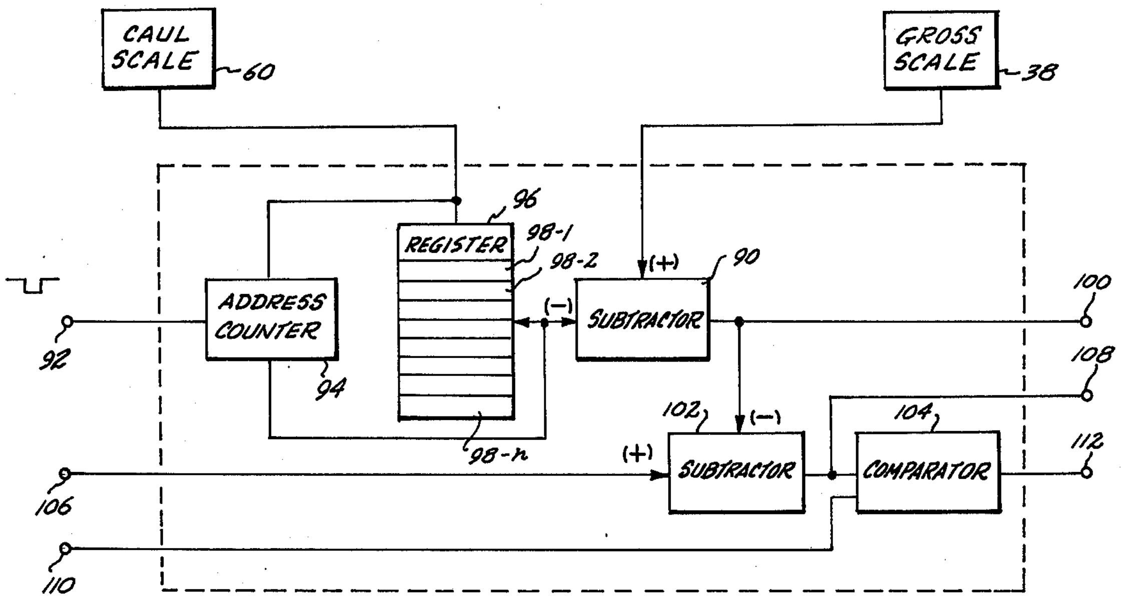
FIG. 2 is a block diagram depicting one embodiment of a mat weighing unit in accordance with this invention.

FIG. 2 depicts one embodiment of a mat weighing system 62 suitable for use in the practice of this invention. As previously stated, the mat weighing system 62 determines the actual weight of each mat 32 by determining the difference between the gross weight of a particular caul 10 and the mat 32 contained thereon and the weight of the same caul 10 prior to the formation of the mat 32. Additionally, the mat weighing system 62 determines whether each mat 32 is within the desired weight limits (tolerance range) and activates the mat rejection mechanism (40 In FIG. 1) to prevent an out of tolerance mat from reaching the press station 16.

As described relative to the particleboard manufacturing system of FIG. 1, a caul 10 is first weighed at the caul scale 60 and then travels along the conveyor 12 with the caul 10 and the deposited mat 32 reaching the gross scale 38 at some later time. Since in the preferred embodiment of this invention, the cauls 10 need not be of the same weight, determining the actual weight of each mat 32 requires the weight of each particular caul 10 reaching the gross scale 38.

In the arrangement of FIG. 2, a technique commonly referred to as a "first-in, first-out" operation is utilized to supply a digital signal to a conventional digital subtractor 90 that represents the weight of a particular caul 10 at the same time that the gross scale 38 couples a digital signal that represents the gross weight of the same caul 10 and the deposited mat 32 to a second input of the subtractor 90. The circuit of FIG. 2 must be initialized for operation each time the particleboard manufacturing system of FIG. 1 is energized, e.g., at the beginning of a work shift or after being deenergized for maintenance purposes. When the system is reenergized and the first caul 10 reaches the caul scale 60, a pulse signal is supplied to a terminal 92 to activate an address counter 94 and a storage register 96. This signal pulse can be supplied from any convenient source. For example, the system operator can provide the signal by means of a dedicated switch or can provide a coded signal from the operator interface unit 68 of FIG. 1 to cause a conventional circuit such as a monostable multivibrator to supply the required pulse. In any case, as the address counter 94 is activated, the digital signal suppled by the caul scale 60 in response to the first caul 10 is stored in a first storage location 98-1 of the storage register 96.

Upon the arrival of the next caul 10 at the caul scale 60, the caul scale supplies a second digital signal to the address counter 94 and the register 96. At this time, the weight of the first caul is shifted to the second storage location 98-2 of the register 96 and the newly arriving weight signal is stored in the first storage location 98-1 of register 96. Additionally, the address counter 94 is again incremented by one count to contain the address of the stored digital signal representing the first caul 10 to have arrived at the caul scale 60. This operation continues as the first caul 10 travels toward the gross scale 38 and further cauls 10 continue to reach the caul scale 60. That is, the arrival of each caul 10 at the caul scale 60 causes a digital signal representing the weight of that caul to be stored in the first storage location 98-1 of the register 96, the weights of each caul previously reaching the caul scale 60 to be shifted to the next storage location of the register 96, and the address counter to be indexed by one storage location to continually access the signal stored in response to the first caul 10 that reach the caul scale 60.

When the first caul 10 reaches the gross scale 38, the system operator again supplies a pulse signal to the terminal 92. The signal applied to the terminal 92 causes the signal stored in the present address location of register 96 to be supplied to the subtractive input terminals of a conventional digital subtractor 90. For example, if the first caul 10 to travel along the conveyor 12 reaches the gross scale 38 after five other cauls have moved across the caul scale 60, the address counter 94 would access the sixth storage location (98-6) and couple the weight of the first caul to the subtractor 90.

Since the gross scale 38 supplies a digital signal representative of the weight of the caul 10 and the mat 32 contained thereon to the additive input of the subtractor 90, the subtractor 90 supplies a digital signal representing the actual weight of that mat 32 to a terminal 100 for use by the process controller 66 of FIG. 1, and for display by the weight display unit 64 if so desired.

After the mat weighing system 62 has been initialized as described above, each signal supplied by the caul scale 60 is coupled to the first storage location 98-1 of the register 96 causing each weight signal previously stored in the register 96 to be advanced by one storage location and causes the address counter to advance to the next storage location. As each caul 10 reaches the gross scale 38, the signal representing the gross weight is coupled to the subtractor 90 and is also coupled to the address counter 94 to cause the counter to decrement to the next previous storage location. It will be recognized by those skilled in the art that the address counter 94 operates in a conventional count-up, count-down manner to synchronously supply the caul weight and the gross weight to the subtractor 90. Thus, as long as no caul 10 is manually removed from the conveyor 12 between the location of the caul scale 60 and the location of the gross scale 38, the subtractor 90 will supply the actual weight of each mat 32 as the mat reaches the gross scale 38.

To supply a signal for activating the rejection station 40 of FIG. 1 when a mat 32 is not within the desired weight range, the mat weighing system of FIG. 2 includes a second conventional digital subtractor 102 and a digital comparator circuit 104. The subtractive input of the subtractor 102 is connected to receive the digital signal representing each actual mat weight and the additive input of the subtractor 102 is connected to a terminal 106 for receiving an applied signal representative of the desired or target mat weight. The target mat weight signal can be supplied to terminal 106 by conventional means such as a switch for supplying a parallel coded digital word, or can be supplied via the operator interface unit 68 of FIG. 1 and stored in a conventional storage register. Thus, as the actual weight of each mat is supplied to the subtractor 102 by the subtractor 90, the subtractor 102 supplies a digital signal representing the weight difference between the mat 32 then located on the gross scale 38 and the target weight. This signal is coupled to terminal 108 for display by the weight display unit 64 and is coupled to one input of the comparator 104.

The second input of the comparator 104 is connected to a terminal 110 which is supplied with a digital signal representing the maximum desired allowable weight deviation. As in the case of the signal representing the target weight, this signal can be supplied by any convenient means. Comparator 104 compares the difference between the mat target weight and the actual mat weight with the desired weight deviation to supply a signal to terminal 112 for activating the rejection mechanism whenever a mat 32 that is not within the acceptable weight range reaches the gross scale 38.

The comparator 104 can be any conventional digital comparator apparatus. For example, the absolute value of the actual weight deviation signal supplied by the subtractor 102 can be obtained by connecting all the data bits of the signal supplied by the subtractor 102 except the sign bit to the subtractive input terminal of another subtractor. If the additive input terminal of this subtractor is connected to receive the desired maximum weight deviation signal (applied to terminal 110), then the sign bit of the subtractor output signal will be in one logic state when the weight deviation is within the acceptable limits and in the second logic state when the weight deviation is outside the acceptable limits.

It will be recognized by those skilled in the art that a variety of apparatus can be configured to achieve the above-described operation of the mat weighing system 62. One particular implementation, that can be advantageous in many situations, is the use of microprocessor apparatus. As is known in the art, a microprocessor includes a random access memory circuit and/or a read only memory circuit for storing sequence instructions and data, and a central processor circuit having a control unit and an arithmetic unit for performing arithmetic operations. One such microprocessor, known as the MCS-4 microprocessor is manufactured by the Intel Corporation and is fully described in the Intel MCS-4 Microprocessor Computer Set Users Manual, March, 1974. When a microprocessor is utilized as the mat weighing system 62, the microprocessor circuitry is connected to perform the above-described operation. Such interconnection of the microprocessor can take various forms and is well known to those skilled in the art (see, e.g., the above referenced manual for the Intel type MCS-4 microprocessor system).

Figure 3:
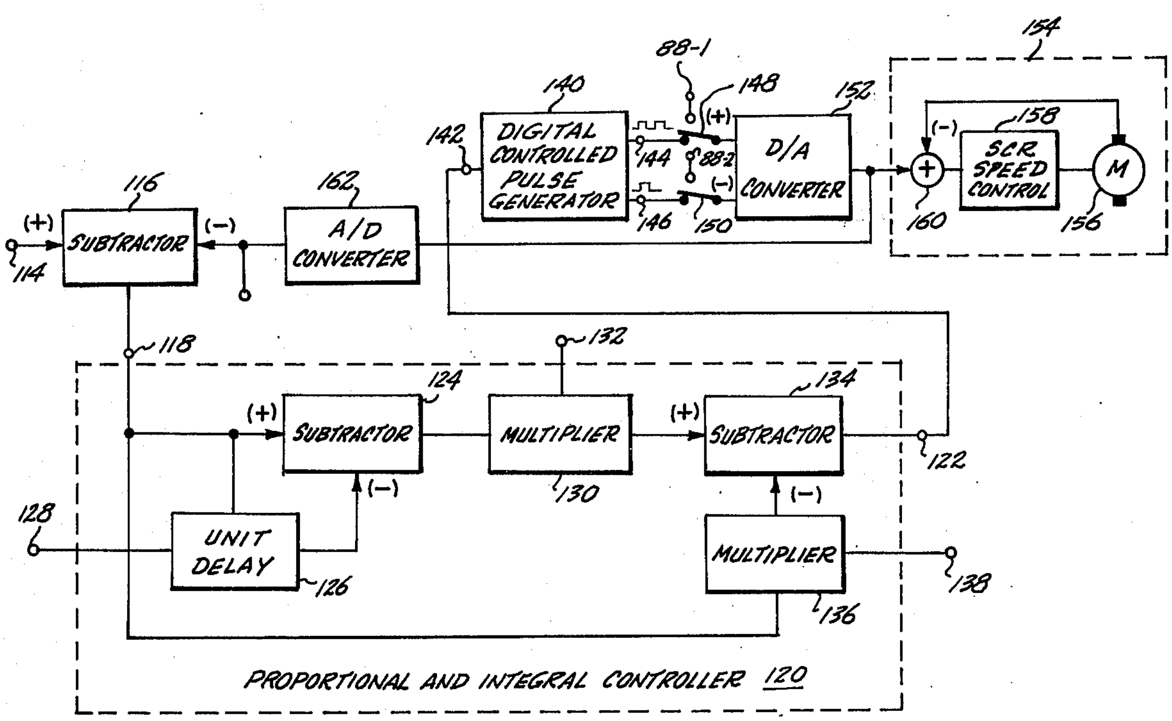
FIG. 3 depicts a former speed control circuit for converting the control signal supplied by the process controller of this invention to a signal compatible with the formers utilized within the particleboard manufacturing system of FIG. 1.

FIG. 3 depicts one embodiment of the former speed control unit 84 of the particleboard manufacturing system depicted in FIG. 1. As previously stated, a separate formed speed control unit is preferably utilized for each master and follower of the formers 20, 22, 24 and 26. Each former speed control unit 84 receives the digital signal supplied by the former speed accumulator 80 during a change in production rate and during normal operation of the manufacturing system with the shutdown compensation controller 76 supplying a digital signal via the gate 79 after each production interruption. The signals applied to the former speed control 84 are effectively commands from the process controller 66 to either increase or decrease the rate at which the associated former is depositing wood particles, with the former speed controller converting these signals to a signal suitable for driving conventional master and follower formers employed within the prior art.

In the arrangement depicted in FIG. 3, the signal supplied by the shutdown compensation controller 76 or by former speed accumulator 80 is applied to a terminal 114 and coupled to the additive input of a digital subtractor 116. As previously mentioned, this signal is effectively a command to speed up or slow down the associated former and will hereinafter be denoted as the former target speed. As shall be described, the subtractive input of the subtractor 116 receives a digital signal that represents the analog voltage presently being applied to the associated former motor. Thus, the subtractor 116 supplies a former speed error signal that is equal to the difference between the former target speed and the present signal supplied to the associated former.

The former speed error is coupled to an input terminal 118 of a proportional and integral controller 120. Proportional and integral controllers are known to those skilled in the art and are circuits for supplying a signal proportional to the input signal at any particular input time and also proportional to the difference between the input signal at two separate input times. With respect to the proportional and integral controller 120 of FIG. 3, the circuit is arranged to provide an output signal equal to $P(e_i - e_{i-l}) + 1e_i$ where P and 1 are a sensitivity constant and an integral gain constant, respectively, $e_i$ is the former speed error supplied to an input terminal 118 of the proportional and integral controller 120 by the subtractor 116, and $e_{i-i}$ is the former speed error at a previous time.

As is illustrated in FIG. 3, this operation is effected by coupling the former speed error signal from the terminal 118 to the additive input of a subtractor 124 and also to the input terminal of a unit delay network 126. The unit delay network 126 supplies an output signal equal to the error signal at a previous time to the subtractive input of the subtractor 124. In situations in which the error signal arriving at terminal 118 is a signal sampled at a particular rate, the unit delay 126 stores the signal arriving at a particular sampling time and supplies the signal to the subtractor 124 at the next sampling time. In other situations, the unit delay 126 can be a conventional circuit such as a shift register that is loaded with the error signal and is strobed by a periodic pulse signal applied to a terminal 128 to cause the signal stored in the shift register to be delivered to the subtractive input terminal of the subtractor 124.

In any case, the output signal supplied by the subtractor 124 is supplied to one input terminal of a multiplier 130. The second input terminal of the multiplier 130 is connected to a terminal 132 for receiving the sensitivity constant P. The sensitivity constant P is supplied by a conventional switch or other means and effectively determines the number of input pulses that must be supplied by the subtractor 124 in order to cause a 1% change in the former speed control signal supplied by the former speed control 84. In the practice of this invention it has been found that a sensitivity constant on the order of 10 is generally satisfactory.

The output of the multiplier 130 is coupled to the additive input of a subtractor 134, the output of which is connected to the output terminal 122 of the proportional and integral controller 120. The subtractive input of the subtractor 134 is connected to a multiplier 136 arranged to multiply the former speed error by the integral gain constant 1 which is supplied to a terminal 138. As in the case of the sensitivity constant P, the integral gain constant 1 is supplied by any conventional means such as a switch having a digitally encoded output. In the practice of this invention, it has been determined that a suitable integral gain constant is non-negative and normally is less than the sensitivity constant P.

The output signal supplied by the proportional and integral controller 120 is connected to a digitally controlled pulse generator 140. The digitally controlled pulse generator 140 can be any conventional circuit arranged to supply an output signal having a pulse frequency propotional to a digital signal applied to a frequency control terminal (terminal 142 in FIG. 3). The digitally controlled pulse generator 140 supplies a pulse signal from a terminal 144 when the signal coupled from the proportional and integral controller 120 is positive and supplies a pulse signal from an output terminal 146 when the signal coupled from the proportional and integral controller 120 is negative.

The signal suppled from the terminals 144 and 146 are respectively connected to one terminal of a switch 148 and a switch 150. The switches 148 and 150 are manually operable to supply the signals supplied by the digitally controlled pulse generator 140 to a digital-to-analog converter 152 or to supply the digital-to-analog converter 152 with signals applied to terminals 88-1 and 88-2. As was described with reference to FIG. 1, the terminals 88 permit the system operator to manually control the master and follower former speeds independently of the signals supplied by the process controller 66. One convenient arrangement for allowing the system operator to exercise this manual control is to connect a pulse generator to each terminal 88-1 and 88-2 via a push button switch. With this arrangement, the pulse generator can supply a constant pulse frequency and the operator can depress the appropriate switch to cause the associated master or follower to speed up or slow down at a rate determined by the supplied pulse frequency.

Regardless of whether the pulses are applied to the digital-to-analog converter 152 by the operator or by the digitally controlled pulse generator 144, the digital-to-analog converter 152 converts the incoming pulses to an analog signal suitable for controlling the conventional master and follower former arrangements. As is indicated in FIG. 3, the conventional arrangement, which is enclosed within the dashed outline 154, includes a motor 156 driven by a conventional silicon controlled rectifier speed control circuit 158. In this arrangement the analog drive signal is connected to an analog summing network 160 which is arranged to subtract the feedback signal from the armature of the motor 156 from the drive signal.

In addition to being connected to the conventional former drive circuit 154, the output of the digital-to-analog converter 152 is connected to an analog-to-digital converter 162 which supplies a digital signal proportional to the former speed control signal supplied at the output of the digital-to-analog converter. This digital is supplied to the subtractive input of the subtractor 116 to cause the subtractor to supply the former speed error as previously described. As shall be described in detail hereinafter, the output signal of the analog-to-digital converter 162 is also connected to a terminal 164 for supplying a digital signal representing the analog control signal applied to each master and follower former to the production rate change controller 72 of FIG. 1.

Figure 4:
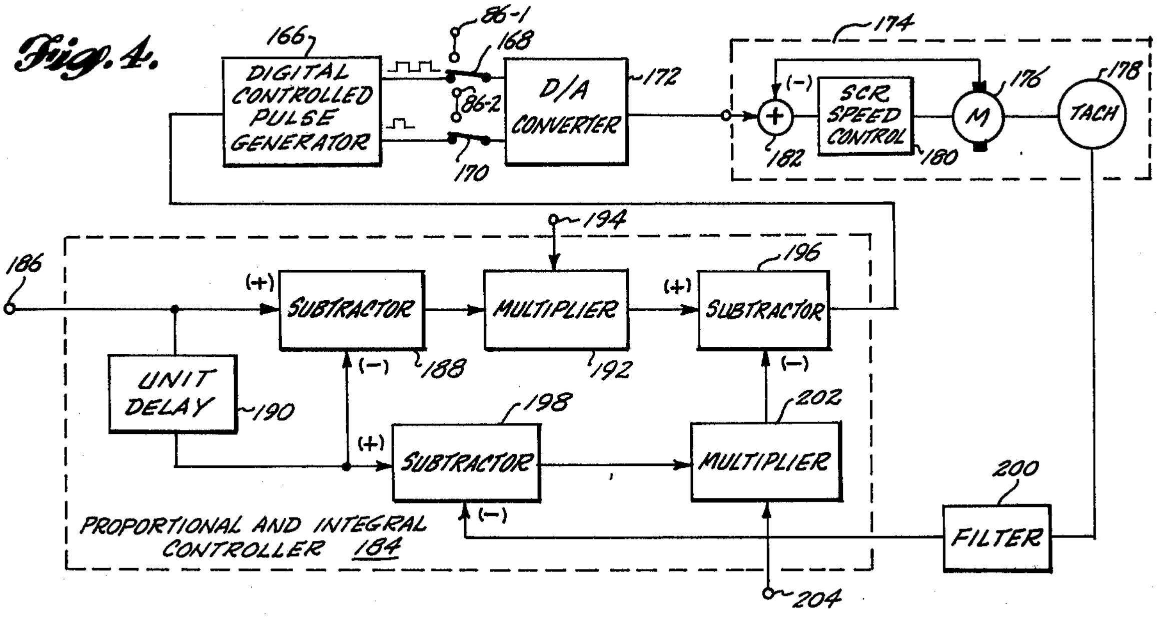
FIG. 4 depicts a line speed control circuit for converting the control signal supplied by the process controller of this invention to a signal compatible with conveyor motors utilized within the particleboard manufacturing system of FIG. 1.

FIG. 4 depicts an embodiment of the line speed controller 82 of FIG. 1 which is similar to the former speed controller of FIG. 3. Specifically, the line speed controller of FIG. 4 includes a digitally controlled pulse generator 166 that can be configured in the same manner as the digitally controlled pulse generator 140 of FIG. 3. For example, the pulse generator 166 can include a digital phase-locked loop and supply the two described output signals by means of a logic gate (or addressable data port) arranged to direct the phase-locked loop output signals to one of the switches 168 or 170. As in the arrangement of FIG. 3, the switches 168 and 170 are arranged to selectively couple the input terminals of a digital-to-analog converter 172 to the output of the pulse generator 166 or to terminals 86-1 and 86-2. Like terminals 88-1 and 88-2 of the former speed controller, terminals 86-1 and 86-2 receive digital signals when the system operator manually activates control switches to cause the line speed to change independently of the process controller 66.

As is shown in FIG. 4, the output of the digital-to-analog converter 172 is connected to a conventional motor arrangement for driving the conveyer 12, e.g., motor 18 of FIG. 1. In FIG. 4, this conventional motor circuit is enclosed within the dashed outline 174 and includes a motor 176 connected to drive a tachometer 178 which produces a digital output signal proportional to the speed of the motor 176. As in the case of the previously described former motor arrangements, the motor 176 is driven by a silicon controlled rectifier speed controller with the armature of the motor 176 being connected to an analog summing network 182. The output of the terminal of the digital-to-analog converter 172 is connected to the second terminal of the analog summing network 182 and the output of the summing network 182 is connected to the output of the silicon controlled rectifier speed control.

The digital signal that controls the digitally controlled pulse generator 166 is supplied by a proportional and integral controller 184. The proportional and integral controller 184 is arranged somewhat differently than the proportional and integral controller 120 of FIG. 3 to provide a control signal to the digitally controlled pulse generator 166 that is proportional to the line speed. Specifically, in the arrangement of FIG. 4, the input terminal 186 of the proportional and integral controller 184, which receives line speed control signals from the grade change controller 70 and the rate change controller 72 of FIG. 1, is connected to the additive input of a subtractor 188 and to the input of a unit delay network 190. The output terminal of the unit delay 190 is connected to the subtractive input terminal of the subtractor 188 and is also connected to the input of a subtractor 198. The output of the subtractor 198 is supplied to one input of a multiplier 192 having a second input thereof connected to a terminal 194 for receiving a signal that establishes the proportional and integral controller sensitivity constant. The subtractive input of the subtractor 198 is coupled to the line speed motor tachometer 178 via a conventional first order exponential filter 200. One input of a multiplier 202 is connected to a terminal 204 for receiving a signal that establishes the integral gain constant of the proportional and integral controller 184 and a second input terminal of the multiplier 202 is connected to the output of the subtractor 198. The outputs of the multipliers 192 and 202 are connected to the inputs of a subtractor 196 which supplies the digital signal to the digitally controlled pulse generator 166.

In view of this arrangement it can be seen that the proportional and integral controller 184 supplies a signal to the digitally controlled pulse generator 166 equal to $P(t_i - t_{i-l} - M)$ where P and 1 are an appropriately valued sensitivity constant and integral gain constant, respectively; $t$ is the line speed command signal supplied by the grade change controller 70, or the production rate change controller 72 of FIG. 1, $t_{i-l}$ is the line speed command signal at an earlier predetermined moment of time and M is the filtered digital signal from the tachometer 178. Comparing this equation to the equation for the proportional and integral controller 120 of the former speed control circuits, it can be observed that the integral term of the proportional and integral controller 184 is proportional to the difference between a previous command signal $t_{i-l}$ and the filtered tachometer signal M. It has been found that this arrangement provides satisfactory operation in controlling a motor circuit such as the circuit 174 wherein the tachometer 178 provides a signal containing a substantial amount of noise. In respect to the operation of the circuit depicted in FIG. 4, it has been found that a unit delay of approximately five seconds provides satisfactory control of the motor circuit 174. In addition, as in the circuit of FIG. 3, a sensitivity constant P on the order of 10 and a nonnegative integral gain constant which is normally less than P provides satisfactory operation.

As has been described, the circuit of FIG. 2 operates in conjunction with the particleboard manufacturing system to determine the net weight of each mat 32 and to control the manufacturing system to reject or accept each mat based on the desired weight tolerance. As has further been described, the circuits of FIGS. 3 and 4 are arranged to control the line speed motor and the former speed motors in accordance with digitial control signals supplied by the process controller of this invention. In the following paragraphs, the structure and operation of the process controller 66 of FIG. 1 to provide these digital control signals will be described.

Figure 5:
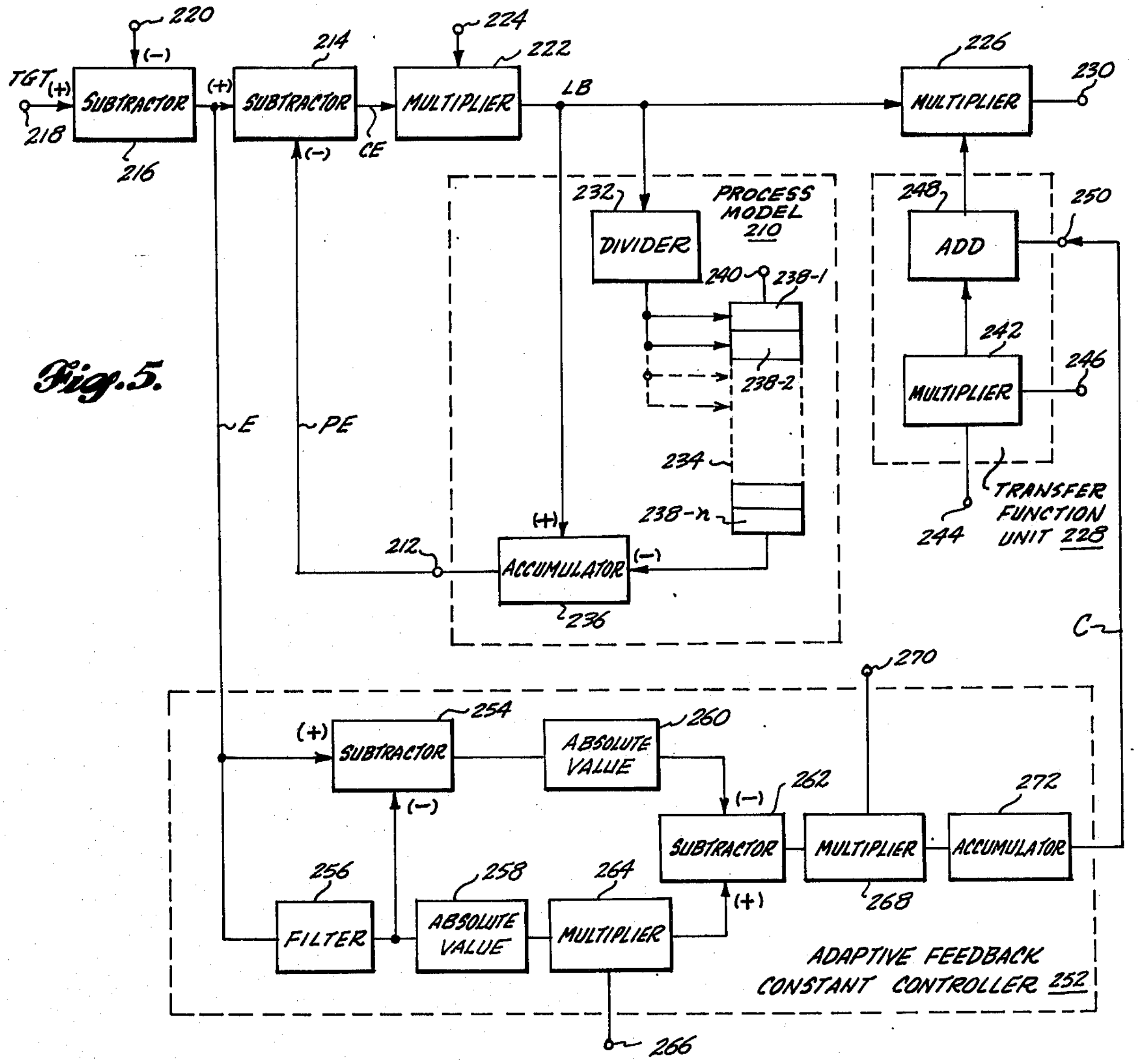
FIG. 5 depicts an embodiment of the mat weight controller included in the process controller of this invention that is depicted in FIG. 1.

The arrangement of this invention to continuously control master and follower speeds of each former 20, 22, 24 and 26 of FIG. 1 is depicted in FIG. 5. Basically, the circuit of FIG. 5 is a feedback control system utilizing model reference control techniques.

Model reference control is a technique of control system design that uses apparatus to "model" the system in that the model is an electrical analog of the physical system being controlled. Thus when an electrical signal representing one of the system control parameters is applied to the model, the model predicts how the controlled physical system will react to that control signal. Differences between this prediction and a later measurement of the actual action that the control parameter causes within the physical system are processed within the feedback control system. These differences are used to update the model so as to provide a more appropriate value for the system control parameter. In this manner, the control parameter is continuously controlled to cause the system to operate in the desired manner.

Specifically, referring to the circuit of FIG. 5, the process model 210 electronically simulates the operation of the particleboard manufacturing system in FIG. 1 in depositing mats 32 on the cauls 10 as the cauls pass along the conveyor 12. As shall be described in more detail hereinafter, each time a mat 32 reaches the gross scale 38, the system of FIG. 5 supplies a control signal to the former accumulator 80 of FIG. 1 for controlling each master and follower former speed.

As this control signal (representing the weight change to be effected by each of the formers), is applied to the input of the process model 210, the process model 210 predicts the weight deviation in each of the mats 32 that will thereafter be arriving at the gross scale 38. This signal or predicted error (identified as PE in FIG. 5) is supplied at a terminal 212 of the process model 210 and is coupled to the subtractive input of a subtractor 214. The additive input of the subtractor 214 is a signal representing the actual or measured error between the desired weight and the weight of the mat 32 then located on the gross scale 38. This error signal, identified by E in FIG. 5, is supplied by a subtractor 216 having the additive input connected to a terminal 218 for receiving a digitial signal representing the desired or target weight and the subtractive input connected to a terminal 220 for receiving the actual weight of a mat 32. As previously described, the actual mat weight is preferably supplied from the mat weighing system 62 of FIG. 2.

Thus it can be seen that the subtractor 214 supplies a signal equal to the difference between the actual weight error of a mat 32 on the gross scale 38 and the predicted error supplied by the process model 210. This difference signal, herein denoted as the control error and identified in FIG. 5 by CE, is coupled input terminal of a multiplier 222. The second input terminal of the multiplier 222 is coupled to a terminal 224 for receiving a digital signal for establishing a proportionality constant. As in the case of the constant terms supplied to the multipliers of FIGS. 3 and 4, this proportionality constant may be supplied by any convenient means such as a switch having a digitally encoded output. The proportionally constant establishes the magnitude of the multiplier 222. In the practice of this invention, it has been found that constants on the order of one half provide satisfactory performance.

The output signal of the multiplier 222 is connected to one input of a multiplier 226. The second input terminal of the multiplier 226 is connected to the output of the transfer function unit 228. As shall be described in more detail hereinafter, the multiplication of the output signal supplied by the multiplier 222 by the multiplicative signal supplied by the transfer function unit 228 supplies a signal to a terminal 230 suitable for the satisfactory control of each of the former speeds. As can be ascertained from FIG. 1, the terminal 230 is connected to the input of each former speed accumulator 80.

Referring now to the process model 210, the model includes a divider cirucit 232, a register circuit 234 and an accumulator cirucit 236. The control signal LB is connected to the input of the divider 232 and is also connected to an additive input of the accumulator 236. The divider 232 is a conventional digital divider cirucit that divides this control signal by a constant which is numerically equal to to the number of cauls 10 that can be positioned directly beneath the formers 20, 22, 24 and 26 of FIG. 1 at any particular time. The output provided by the divider 232 is connected to a number of storage locations within a conventional storage register 234. The number of storage locations connected to the output of the divider 232 is again numerically equal to the number of cauls 10 that can be positioned beneath the formers 20, 22, 24, and 26. In addition, the number of storage locations within the register 234 is numerically equal to the number of cauls 10 that are located between the first surface former 20 and the gross weight scale 38.

The correspondence between the process model 210 and the particleboard manufacturing system of FIG. 1 can be understood by examining the process model in view of the system as illustrated in FIG. 1. First, each storage location of the register 234 corresponds to a caul 10 located on the conveyor 12 between the first surface former 20 and the gross weight scale 38. Specifically, the uppermost storage location 238-1 corresponds to that caul 10 located under the formers and nearestmost the caul scale 60, and the lowermost storage region **238-*n* corresponds to the caul 10 and mat 32 then located on the gross scale 38. For purposes of explanation, it may conveniently be assumed that the cauls 10 are of a dimension such that two cauls can simultaneously be located under the formers 20–26 and that six cauls can be located between the first former 20 and the gross scale 38.**

In this situation, the control signal LB to be supplied to the particleboard manufacturing system is divided by the factor two within the divider 232 and the resulting signal is coupled to the storage locations 238-1 and 238-2 of the register 234. This corresponds to the actual physical situation in that the two cauls presently under the formers 20-26 will receive a greater or lesser volume of wood particles, (depending on whether the signal LB is a command to increase or decrease the former speeds), and those cauls 10 located between the final surface former 26 and the gross scale 38 (represented by the storage locations 238-3 through 238-6) have passed beyond the final former 26 and thus cannot be affected by the change in former speeds caused by the signal LB.

As each caul 10 of the particleboard system reaches the gross scale 38, the digital numbers stored in the storage locations 238-1 through 238-6 of the register 234 are advanced by one storage location. This shifting of the stored data corresponds to the passage of the cauls 10 along the conveyor 12 by one caul length and is effected by a signal applied to a terminal 240 of the register 234. This signal can be supplied by various conventional means that sense that a new gross weight measurement has occurred and supplies a suitable output signal. For example, a monostable multivibrator can be connected to supply a signal pulse each time that the mat weighing system 62 of FIG. 1 supplies a mat weight signal to the process controller 66.

As the data in the storage location 238-6 is tranferred to the subtractive input of the accumulator 236, the accumulator 236 supplies a predicted error signal that is equal to the difference between the control signal LB and the number stored in the storage location 238-6 of the register 234 added to the predicted error, PE, supplied for the last caul 10 passing over the gross scale. Stated in another manner, the accumulator 236 effectively integrates the predicted error with respect to each caul 10 that passes over the gross scale 38 by summing the presently held predicted error with the difference between the present control signal LB and the number stored in the storage location 238-6.

The predicted error, PE, supplied by the integrator 236 is then subtracted from the measured error, E, of the mat 32 at the gross scale 38 to supply a new control error, CE, and hence a new control signal LB. A signal LB is supplied to the process model 210 with each mat 32 reaching the gross scale, the signal LB is divided by the factor two (within the divider 232) and the result is added to the values within storage locations 238-1 and 238-2 of the register 234.

From the above description, it can be seen that, in essence, the divider circuit 232 supplies a digital signal to the first two storage locations (238-1 and 238-2) that represent the weight change that should be occurring on the two cauls 10 that are then passing under the formers (20 through 26). These digital signals are then shifted through the register 234 to arrive at the integrator 236 and modify the predicted error at the same time the corresponding caul 10 reaches the gross scale 38. In this manner, if the proper control action has been taken and there is no further change in the manufacturing process such as a change in wood particle density, the predicted error and the measured error would be equal and the control signal LB would be equal to zero. If the measured weight and the target weights are not equal, however, the predicted error (PE) and the measured error (E) will not be equal and a corrective control signal LB will be supplied.

The operation of the process model 210 can be further understood by examining the system operation when an abrupt change in wood particle density causes a change in the weight of the mats 32. For the purpose of this illustration, assume that the system is operating to produce mats of a 300 pound target weight and each of the mats have corresponded to this weight until a change in wood particle density causes a succession of mats 32 having weights of 310 pounds, 312 pounds, 316 pounds, 318 pounds, and then the system stabilizes such that each mat 32 to be produced after this time would also be 318 pounds unless some control action were taken.

Prior to the 310 pound mat 32 passing onto the gross scale 38, the measured error E, the control signal LB, and the predicted error PE will each be zero and zeros will be stored in each storage location of the register 234, since all previous mats 32 have corresponded to the target weight. For simplification, further assume that the gain of the multiplier 222 is unity such that the control error (CE) produces a control signal LB of equal magnitude.

When the 310 pound mat 32 reaches the gross scale 38, the measured error becomes 10 pounds, the control error LB becomes 10 pounds and the predicted error becomes 10 pounds with the divider 232 storing 5 pounds of the change in each of the storage locations 238-1 and 238-2. When the 312 pound mat 32 reaches the gross scale 38, the measured error becomes 12 pounds; the control error, which is the difference between the measured error and the predicted error of 10 pounds, becomes 2 pounds; and the predicted error, which is the previous predicted error of 10 added to the difference between the control error (2 pounds) and the value shifted from storage location 238-6 (0 pounds), becomes 12 pounds. At this time, the divider 232 causes a 1 pound change to be stored in the storage location 238-1 and 1 pound change to be added to the 5 pounds stored in storage location 238-2. For simplicity, the values stored in the register 234 can be represented as 165000 where each numeral represents the signal values respectively stored in the registers 238-1 through 238-6.

Thus, when the 316 pound mat reaches the gross scale 38, the measured error will be 16 pounds, the control error will be 4 pounds and the predicted error will become 16 pounds. The control error of 4 pounds will cause the values stored in the storage locations 238-1 through 238-6 to respectively become 236500. When the first 318 pound mat arrives at the gross scale 38, the measured error is 18 pounds, the control error is 2 pounds and the predicted error becomes 18 pounds. At this time, the values stored within the storage locations 238-1 to 238-6 respectively become 133650.

Now when the next mat 32 (318 pounds) arrives at the gross scale 38, the measured error is 18, the control error becomes zero (since the predicted error was 18), and the predicted error remains at 18 pounds. At this time, the values in the storage locations 238-1 through 238-6 will become 013365.

The next mat 32 that reaches the gross scale 38 was partially by the formers 20-26 when an original control error of 10 pounds was supplied (as the 310 pound mat reached the gross scale), hence if the system is performing satisfactorily this mat 32 will be 5 pounds lighter than if no control action had been taken. Since it has been assumed that the system would have stabilized to produce mats of 318 pounds, this mat would then weigh 313 pounds.

As this mat enters the gross scale 38, the control error is zero, and the 5 pound signal stored in the storage location 238-6 is coupled to the accumulator 236 to cause the predicted error to become 13 pounds. Hence, if the measured weight is 313 pounds, the control system has responded as expected and the control error remains zero. At this time, the values stored in the storage locations 238-1 through 238-6 becomes 001336. Since the next mat 32 to arrive at the gross scale 38 should have been affected by the first 10 pound control error and one half of the next control error of 2 pounds, proper operation of the formers in response to these control errors would produce a mat having a weight of 307 pounds. When this mat 32 reaches the gross scale 38, the control error is zero, the 6 pounds stored in the storage location 238-6 is coupled to the accumulator 236 to be combined with the previous predicted error of 13 and provide a predicted error of 7 pounds. Hence, if the arriving mat is 307 pounds, no control action is needed or supplied. At this point, the storage locations 238-1 through 238-6 contain the values 000133.

In the same manner, proper action by the formers in response to the control erros of 10 pounds, 2 pounds, and one half of the 4 pound control error would cause the next mat 32 to weigh 304 pounds. With the arrival of this mat it can be seen that the 3 pound signal stored in storage location 238-6 is combined with the previous 7 pound predicted error within the accumulator 236 to result in a predicted 4 pound error. Hence, once again, if the system has fully responded to the control error and no further disturbances have taken place, the control error remains zero.

Continuing in the same manner, it can be seen that the next mat 32 should weigh 301 pounds and the process will supply a 1 pound predicted error by combining the 4 pound predicted error produced by the previous operation and the 3 pound signal that will be stored in storage location 238-6. The weight of the next arriving mat 32 should reflect the total control effected by the above described control error signals and have a weight of 300 pounds. As can be seen from the above described operation, the predicted error at this time is zero and if the weight of the mat 32 is 300 pounds, no new control error is generated. Thus, once again, the system is providing mats of the 300 pound target weight.

It will be recognized by those skilled in the art that the above described example is greatly simplified in that further changes in the density of the wood particles can often occur or the formers may not respond in exactly the desired manner. It will however also be recognized that regardless of further disturbances that take place, the process model 210 continually provides a predicted error that will cause the generation of a control error to, in turn, cause the formers to speed up or slow down and thereby reduce the measured error.

As previously described, the transfer function unit 228 supplies a signal which is combined with the control signal LB within the multiplier 226 to produce a signal compatible with each former speed control circuit of FIG. 3. In effect, the control signal LB is a signal representative of the number of pounds of wood particles that the formers 20–26 (FIG. 1) are to add to the mat 32 of each caul 10 and the signal supplied by the transfer function unit 228 is a multiplicative factor which converts the signal LB to a signal representing the percentage of speed change in each master and former speed.

In the practice of this invention, it has been found that satisfactory operation of the particleboard manufacturing system of FIG. 1 is attained when the signal supplied by the transfer function unit 228 is of the form $AS_1 + C$ where $S_1$ is the line speed as supplied by the tachometer 178, and A and C are constants. As shall be described in more detail hereinafter, it has also been found that more optiminal performance can be attained if C is not a constant but is adaptively derived on the basis of the measured error of each mat 32.

In any case, the transfer function unit 232 of FIG. 5 includes a multiplier 242 having one input 244 connected to receive the line speed signal and the second input 246 connected to receive a signal representing the constant term A. The signal representing the constant term A can be supplied by an convenient source such as a switch having a digitally encoded output or can be permanently stored in a register or other circuit means. The output of the multiplier 242 is connected to an adder 248, the second input of which is connected to a terminal 250 that is connected to receive a signal representative of the term C. The output of the adder 248 is connected to the multiplier 226 to supply the previously described former speed controls to the terminal 230.

Although satisfactory performance can be achieved in embodiments where the term C is a constant, such an embodiment of the invention will often cause a compromise in performance. Specifically, in order to achieve rapid response of the mat weight controller to a disturbance such as a change in wood particle density, it is desirable to select a particular value C which is dependent on the particular manufacturing system in which the invention is embodied. This value of C, although causing the desired rapid response, will often cause the mat weight controller to effectively become an underdamped control system. Thus, under certain disturbance conditions, the mat weight controller could supply control signals that cause the weight of the mats 32 to periodically vary about the target weight.

As is known in the art, one approach to designing a near optimal control system that is subject to such unpredictable disturbances, is the use of adaptive control of one of the system control parameters. Such adaptive control causes the system to provide the desired response when the system disturbances are within certain bounds, and effectively detunes the control system when large disturbances which would normally cause undesired system response are present. This action effectively changes the response rate of the system until the disturbances are back within the acceptable bounds.

Referring again to FIG. 5, it can be noted that the adaptive feedback constant controller 252 is arranged to supply transfer function unit 228 that is based on the measured error, E, supplied by the subtractor 216 in the previously described manner. As can be seen in FIG. 5, the measured error is coupled to the additive input of a subtractor 254 and is also connected to the input of a conventional first order exponential filter 256. The output of the filter 256 is connected to the subtractive input of the subtractor 254 and is also connected to the input terminal of an absolute value unit 258. The output of the subtractor 254 is connected to the input of an absolute value unit 260, the output terminal of which is connected to the subtractive input of subtractor 262. Each absolute value unit 258 and 260 determines the absolute value of the respective input signal. As will be recognized by those skilled in the art, in a digital system such as the system of FIG. 5, the absolute value is normally obtained simply by truncating the sign bit from the digital input word. In any case, the additive input of the subtractor 262 is connected to the output of a multiplier 264 having one input thereof connected to the output of the absolute value unit 258 and the second input connected to a terminal 266. In the practice of this invention, it has been found that satisfactory operation is achieved when a digital signal having a constant value on the order of 1.5 is coupled to the terminal 266 in the previously described manner.

The output of the subtractor 262 is coupled to one input terminal of a multiplier 268 having the second input connected to a terminal 270 for receiving a constant digital signal. The output of the multiplier 268 is connected to the input of an accumulator 272 which supplies the adaptive term C to the terminal 250 of the transfer function unit 228.

Figure 6:
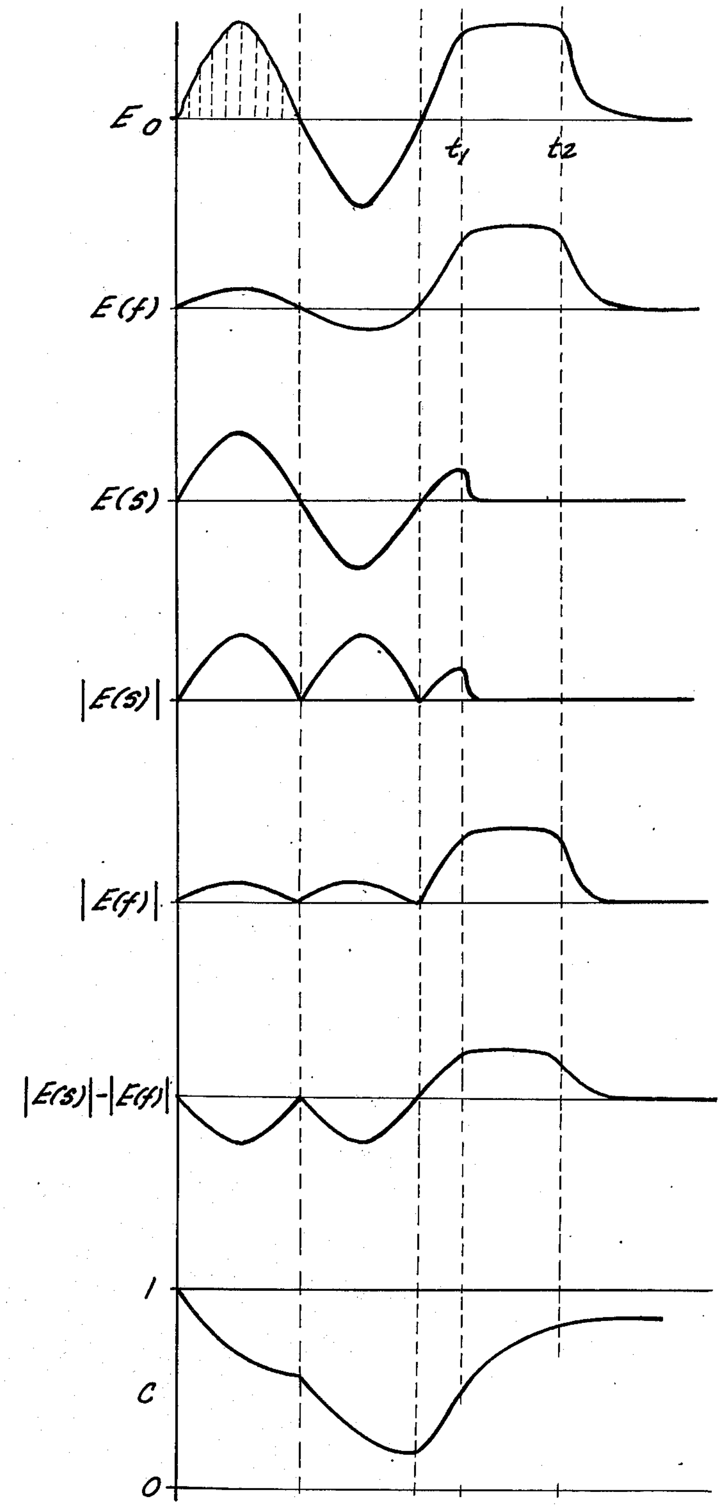
FIG. 6 graphically depicts signals that are useful in understanding the operation of the adaptive feedback controller included in the mat weight controller of FIG. 5.

The operation of the adaptive feedback constant controller 252 to control the transfer function adaptive term C so as to effect more optimal system performance can best be understood with reference to FIG. 6. FIG. 6 depicts various signal wave shapes produced within the adaptive feedback constant controller 252 to illustrate automatic control of the term C whenever the mat weight controller 74 (FIG. 1) does not cause the weight of the mats 232 to converge to near the target weight. The signal E of FIG. 6 depicts the measured error delivered to the input terminal of the adaptive feedback constant controller 252. It will be recognized that the wave shapes depicted in FIG. 6 represent the envelopes of the depicted signals and that each signal comprises a sequence of digital values supplied as each caul 10 reaches the gross scale 38. Thus, as is indicated by the vertical lines within the signal E of FIG. 6, each of the signals corresponds to what is commonly called a sample data signal.

Prior to the time *t*1 in FIG. 6, the system measured error E is depicted as varying about zero in a generally sinusoidal manner. As previously described, such behavior is often encountered in control systems wherein the control system is effectively underdamped with respect to large unpredictable disturbances within the system being controlled. As is depicted in FIG. 6, when such a condition occurs in the particleboard manufacturing system of FIG. 1, the signal, E(*f*), provided by the exponential filter 256 of the adaptive constant controller 252 is effectively an attenuated version of the measured error, E, during the time period 0-*t*1. Hence the output of the subtractor 254 during this time period is a signal E(*s*) having the same general wave shape as the signal E but having a reduced magnitude.

Since the magnitude of the signal E(*s*) is greater than the magnitude of the signal E(*f*), the difference between the rectified signals |E(*f*)| and |*E*(s)| (respectively supplied by the absolute value units 260 and 258) is negative and varies between 0 and a value equal to the difference between the maximum values of the signals provided by the subtractor 254 and the exponential filter 256. As is shown in FIG. 6, when this signal is applied to the accumulator 272 via the multiplier 268, the value of the adaptive term C decreases in a somewhat linear manner from the maximum value C supplied to the transfer function unit 228 when there are no major disturbances present in the particleboard manufacturing system. With respect to one embodiment of the invention, a maximum value of C substantially equal to unity provides satisfactory operation.

In any case, observing the signal C depicted in FIG. 6 in view of the circuit arrangement of FIG. 5, it can be seen that whenever the measured error E varies in the described manner about the value zero that the term C will decrease causing a modification in the signal supplied by the transfer function unit 228. Such a change in the signal C provided by the transfer function unit 228 causes a corresponding decrease in the former speed control signal supplied by the multiplier 226 to the terminal 230. Thus, although the formers are controlled to decrease the measured error, the supplied control signal will not cause the formers to reduce the measured error to zero, but will cause the measured error to approach some constant value. With respect to FIG. 6, this occurs at the time denoted *t*1. When the measured error, E, approaches this value, the input to the exponential filter 256 becomes a relatively constant value causing the signal E(*f*), supplied by the filter, to rise toward that value. Accordingly, the output signal E(*s*), supplied by the subtractor 254 begins to converge toward a value of zero. This decrease in the signal E(*s*) when combined in the subtractor 262 with the increase in the signal E(*f*)

causes the signal $|E(f)| - |E(s)|$ to become positive. This positive input signal applied to the accumulator 272 causes the accumulator to begin increasing the value of C. As the value of C increases, the former speed control signal supplied to the terminal 230 increases so that the formers will act in a manner causing the measured error to decrease, i.e., the formers will be adjusted to cause the weight of each mat 32 to approach the target weight. Thus, as the adaptive feedback constant controller 252 causes the value of C to increase, the measured error is caused to decrease toward zero.

As can be seen in FIG. 6, as the measured error decreases, the value of C continues to increase until the weight of each mat 32 approaches the target weight and the value of C approaches the maximum desired value. At this time, the system is under complete control and the value of C is established to provide rapid former response to correct the measured errors normally encountered with the operation of the manufacturing system of FIG. 1.

It will be recognized by those skilled in the art that the magnitude of the signal C of FIG. 6, supplied by the accumulator 272 of FIG. 5, is controlled by the constant value coupled to the terminal 270. Similarly, the ratio between the negative slope (during the time period prior to time *t*1) and the positive slope (after time *t*1) is controlled by the constant value coupled to the terminal 266. In one embodiment of this invention constants on the order of 0.0007 and 1.5 are respectively employed. Further, it should be noted that FIG. 6 is merely illustrative of the operation of the adaptive feedback constant controller 252. In this respect, the previously mentioned embodiment of the invention effected more rapid control of the former speeds than is indicated in FIG. 6, thereby resulting in less mat weight variation than is indicated by the signals of FIG. 6.

In view of the above description of the mat weight controller of FIG. 5, it can be seen that, in accordance with this invention, the mat weight controller (74 of FIG. 1) effects continuous control over each master and follower speed of the formers 20–26 of FIG. 1. As described, the mat weight controller is a feedback control system in which the measured mat weight error is determined and combined with a predicted error that is supplied by the mat weight controller. The combination of these error signals provides a control signal (LB) proportional to the action that should be taken by the formers to reduce the measured error and the control signal is multiplied by a transfer function to supply a signal for effecting the proper former speeds. As further described, the mat weight controller of this invention includes adaptive feedback to provide a transfer function that supplies near optimal operation when the manufacturing system is subjected to one range of variation in wood particle density and yet remain under control upon the occurrence of a disturbance having magnitude which would otherwise cause the mat weight controller to operate in a rather unstable oscillatory manner.

Figure 7:
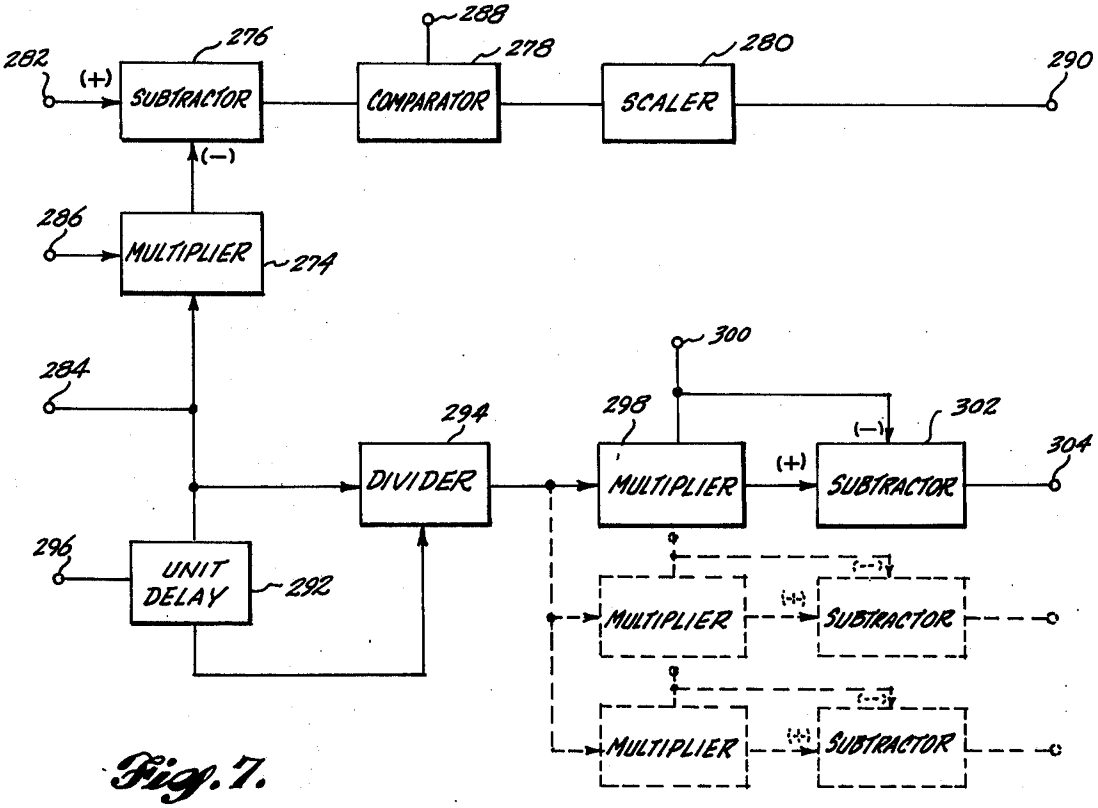
FIG. 7 is a block diagram depicting an embodiment of the production rate controller of the process controller of this invention depicted in FIG. 1.

FIG. 7 depicts an embodiment of the production rate controller (72 of FIG. 1) in accordance with this invention. The production rate controller of FIG. 7 supplies a command signal for changing the conveyor or line speed and simultaneously supplies command signals for changing each former speed to cause the manufacturing system of FIG. 1 to achieve a desired production rate while simultaneously supplying mats 32 within the acceptable weight tolerance range.

The circuit of FIG. 7 effects line speed control by determining the difference between the present line speed and the line speed necessary to achieve the desired production rate and by causing the line speed to increase or decrease at a constant rate whenever this difference exceeds a predetermined threshold value. With respect to former speed control, the circuit of FIG. 7 causes the former speeds to increase or decrease based on a ratio between the line speed at one particular time and the line speed at an earlier time.

In particular, the portion of the circuit of FIG. 7 that supplies the line speed command signal includes a multiplier 274, a subtractor, a comparator 278, and a scaler unit 280. A digital signal representing the desired production rate is coupled to a terminal 282 which is connected to the additive input of the subtractor 276. The subtractive input of the subtractor 276 is connected to the output of a multiplier 274 having the inputs thereof connected to a terminal 284 and a terminal 286. The signal supplied by the line speed accumulator 78 of FIG. 1, which corresponds to the desired line speed or target line speed at any given time, is connected to the terminal 284. The terminal 286 is connected to receive a signal proportional to the volume (product of the length, width and thickness) of the grade of particleboard presently being manufactured. This signal can be supplied by suitable switches activated by the system operator or can be supplied by conventional computational means included within the production rate controller 72.

In any case, the multiplier 74 produces a signal representing the desired production rate of the particleboard system. Thus, the subtractor 276 supplies a signal proportional to the amount of change required in order to achieve the new production rate. This signal is coupled to a conventional comparator circuit 278 and compared to a digital signal connected to a terminal 288 of the comparator 278. The signal supplied to the terminal 288 of the comparator 278 can be controlled by the system operator with various conventional means, e.g., switches, or the comparator 278 can be configured to utilize a constant value. In any case, whenever the magnitude of the signal supplied by the subtractor 276 exceeds a threshold that is established by the signal applied to the terminal 288, the comparator 278 supplies a signal to the scaler unit 280.

The scaler unit 280 is arranged to supply a constant digital number to the line speed control circuit of FIG. 4 via the terminal 290 whenever an appropriate signal is supplied by the comparator 278. More explicitly, the scaler 280 supplies a positive digital number to the terminal 290 whenever the comparator determines that the threshold value is exceeded and the input to the comparator 278 is positive, and supplies a negative digital signal of equal value when the input to the comparator 278 is negative and of a magnitude that exceeds the threshold value. It will be recognized by those skilled in the art that various circuits can be embodied to provide the described operation of the scaler 280. For example, the scaler 280 can include a storage register having the desired digital word stored therein with the sign bit of the desired digital word contained in one storage location. In this arrangement, a simple logic gate can be connected to be responsive to the signal supplied by the comparator 278 and gate the sign bit to the terminal 290 in accordance with the signal supplied by the comparator 278. Regardless of the exact configuration of the scaler 280, the circuit of FIG. 7 supplies a digital signal to the line speed control circuit of FIG. 4 which will cause the line speed to increase or decrease at a linear rate whenever the difference between the desired production rate and the present production rate exceeds a certain value.

To simultaneously control each of the former speeds, the target line speed that is applied to terminal 284 (from accumulator 78 of FIG. 1) is coupled to the input of a unit delay network 292 and to the input of a divider 294. The output of the unit delay 292 is connected to the other input of the divider 294 such that the output signal supplied by the divider 294 is equal to the quotient between the target line speed at any particular time and the target line speed at a previous time that is determined by the unit delay network 292. As in the case of the previously described unit delay circuits, e.g., unit delay 190 of the line speed control circuit of FIG. 4, various suitable unit delay networks are known to those skilled in the art. For example, the unit delay 292 can comprise a digital latch circuit which is strobed by a control signal applied to a terminal 296 to load the unit delay network with the present target line speed simultaneously coupling the previously stored line speed to the divider 294. In the practice of this invention it has been determined that a 5 second delay period provides satisfactory operation.

The signal supplied by the divider 294 is coupled to one input terminal of a multiplier 298 having the second input thereof connected to a terminal 300. The terminal 300 is connected to the terminal 164 of FIG. 3 to receive the signal supplied by the analog-to-digital converter 162. As was previously described relative to FIG. 3, the analog-to-digital converter 162 provides a digital signal proportional to the command signal being supplied to an associated master or follower of one of the formers 20–26. Thus, the multiplier 298 supplies a signal proportional to the product of the present desired former speed and the rate at which the line speed is changing. To convert the signal supplied by the multiplier 298 to a signal representing the necessary change in former speed, the output signal of the multiplier 298 is supplied to the additive input of a subtractor 302 and the former speed signal supplied to the terminal 300 is coupled to the subtractive input of the subtractor 302. With this arrangement, the subtractor 302 supplies a signal to the terminal 304 which is proportional to the desired change in former speed. This signal is coupled to an associated accumulator 80 of FIG. 1 to be summed with any other present former speed control signals and is then coupled from the accumulator 80 to a former speed control circuit of FIG. 3. As is indicated by the dotted lines in FIG. 7, a separate multiplier 298 and subtractor 302 is required to control each master and follower speed of the formers 20–26 of FIG. 1. With this arrangement, it can be recognized that a particular multiplier 298 and a particular subtractor 302 is associated with a particular accumulator 80 of FIG. 1 and thus is associated with a particular master or follower former.

Figure 8:
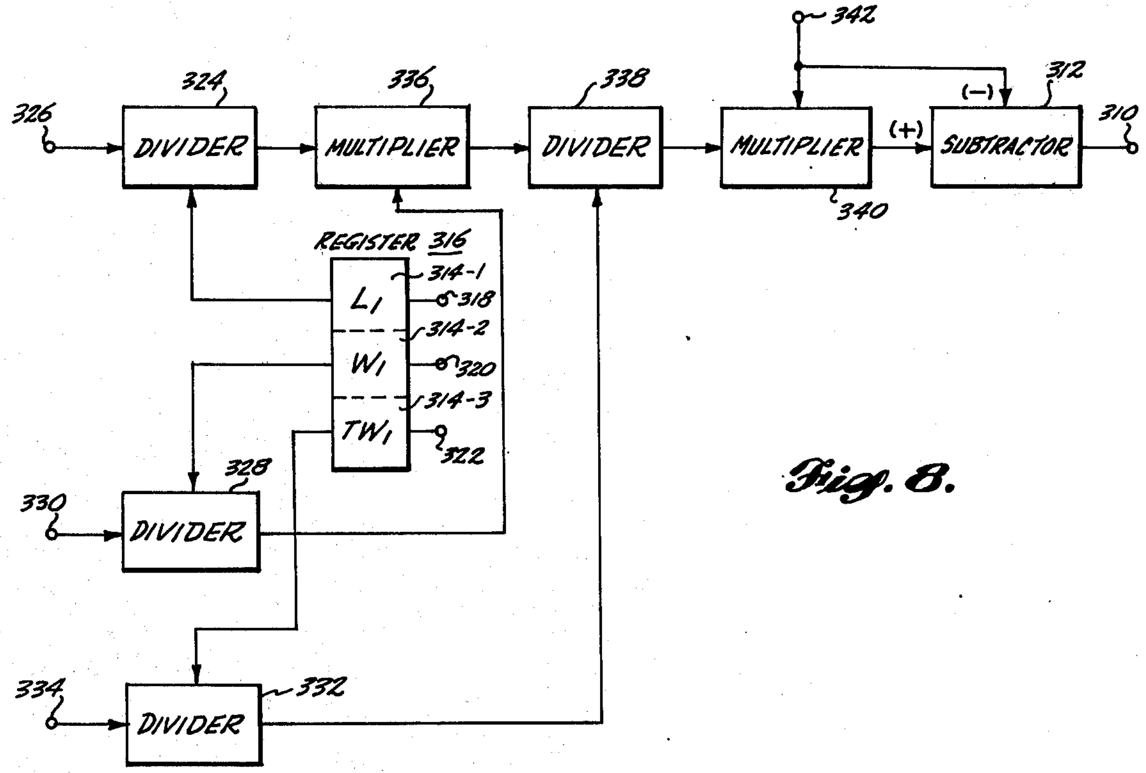
FIG. 8 is a block diagram depicting an embodiment of the grade change controller of the process controller of this invention depicted in FIG. 1.

An embodiment of the grade change controller 70 of FIG. 1 is depicted in FIG. 8. As previously described, the grade change controller 70 enables the system operator to change from the manufacturer of one particular type or grade of particleboard to another grade in an efficient manner which reduces the changeover time and also greatly reduces the number of rejected mats normally associated with such a change.

Since each grade of particleboard may require a mat 32 having a certain length and width dimension and each grade will generally require a certain mat target weight, the circuit of FIG. 8 is arranged to control the line speed of the system of FIG. 1 in accordance with the changes in these parameters that must be made to begin the manufacture of another grade of material. In this respect, it can be shown that the line speed required to produce a new grade of particleboard $LS_2$ is given by the expression $$LS_2 = LS_1(TW_1/TW_2)\,(L_2/L_1)\,(W_2/W_1)$$

where $LS_1$ is the current line speed, $TW_1$ and $TW_2$ are respectively the target weights of the grade presently being produced and the grade to be produced, $L_1$ and $L_2$ are respectively the length dimensions of the mat 32 for the grade currently being produced and the grade to be produced, and $W_2$ and $W_1$ are respectively the width dimensions of the mat 32 for the grade currently being produced and the grade to be produced.

With respect to the circuit of FIG. 8, the line speed signal $LS_2$ is supplied at the output 310 of a subtractor 312. In effecting a grade change, the length, width and target weight of the particleboard grade currently being manufactured are respectively stored in storage locations 314-1, 314-2 and 314-3, of a register 216. Digital signals representing these parameters can be respectively entered from the terminals 318, 320, and 322 by conventional digitally encoded switches or can be supplied from the operator interface unit 68 of FIG. 1. Storage location 314-1 of the register 316 is connected to a divider 324 having the second terminal thereof connected to a terminal 326. The storage location 314-2 of register 316 is connected to one input of a divider 328 having a second input thereof connected to a terminal 330. In a similar manner, the storage location 314-3 of the registers 316 is connected to a first input of a divider 332 having the other input thereof connected to a terminal 334. Digital signals representing the length, the width, and the target weight of the grade of particleboard to be manufactured are respectively coupled to the terminals 326, 330 and 334. As has been previously described, these signals can be provided by any convenient means.

The output of the dividers 324 and 328 are connected to the inputs of a multiplier 336 the output of which is connected to one input of a divider 238 having the second input connected to the output of the divider 332. The output of the divider 338 is connected to one input of a multiplier 340 having the second input connected to a terminal 342. The terminal 342 is connected to receive a digital signal from the output of the accumulator 78 of the process controller of FIG. 1. It can be noted in examining the circuit of FIG. 8 that the output of the multiplier 340 corresponds to the equation above for the line speed necessary to produce the new grade of particleboard ($LS_2$) except that a multiplicative factor proportional to the line speed signal supplied by the accumulator 78 is utilized instead of the target line speed of the previous grade. This arrangement is advantageous in that storage means are not required for storing the line speed, $LS_1$, of the particleboard being manufactured when the grade change is initiated and is further advantageous in that the subtractor 312 having the subtractive input terminal thereof connected to the terminal 342 and the additive input thereof connected to the multiplier 340 will supply a signal to the terminal 310 that is equal to the difference between the present line speed control signal supplied by the accumulator 789 and the line speed that must be achieved to produce the new grade of particleboard. With this arrangement the magnitude of the line speed control signal at terminal 310 is proportional to the amount of line speed adjustment required at any given time and the line speed smoothly converges to the proper value.

Since the arrangement of FIG. 8 does not control the master and follower formers of each former 20–26 of FIG. 1, it is generally necessary after initiating a grade change to initiate a production rate change to achieve the desired production rate for the new grade of particleboard. Although embodiments of this invention could be arranged to control the former speeds, it has been found advantageous to effect a grade change and then effect a production rate change to achieve production of a new particleboard at any desired production rate. In this respect, it has also been found somewhat advantageous to effectively disable the mat weight controller 74 during the time at which a grade change is effected. In one embodiment of the invention, the effective disabling of the mat weight controller 74 is achieved by coupling a digital signal representative of the numeral 0 to the input 224 of the multiplier 222 of the mat weight controller depicted in FIG. 5. This signal can be provided by various conventional means such as a switch or an arrangement of logic gates that are activated simultaneous with the entry of the length, width and target weight parameters of the new grade of particleboard to be manufactured.

Figure 9:
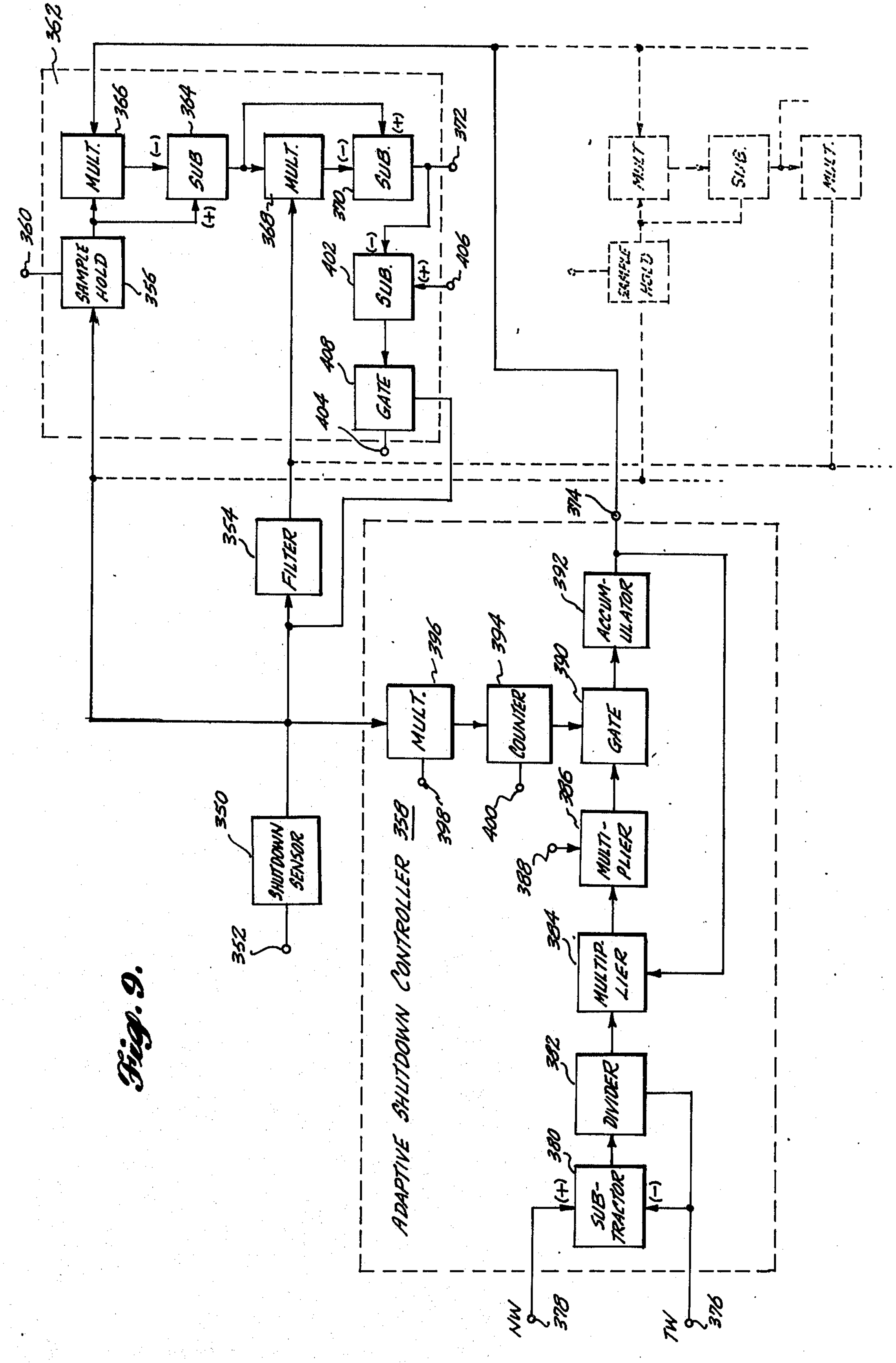
FIG. 9 is a block diagram of an embodiment of the shut down compensator controller included within the process controller of this invention depicted in FIG. 1.

An embodiment of the shutdown compensation controller 76 of the process controller 66 (FIG. 1) is depicted in FIG. 9. As previously described, one difficult situation in the operation of a prior art particle board manufacturing system occurs when the system is shut down for a short period of time. When such an interruption occurs, the wood particles within each of the formers begin to dry and thus decrease in density. As is known in the art, if the master and follower speed of each former 20–26 of FIG. 1 remains at a constant setting, each former will deposit a greater volume of wood particles when the system is reactivated, and thus produce mats 32 that are heavier than those being produced when the system was shut down. In this respect, it has been determined that the relationship between the decrease in wood particle density and the time duration of the shutdown, is generally exponential in nature. Accordingly, it is one aspect of the shutdown compensation controller of FIG. 9 to decrease the master and follower speed of each former 20–26 to compensate for this exponential decrease in wood particle density.

Additionally, since it has been determined that the exponential decrease in the density of the wood particles is related to a number of other factors such as the original moisture content of the wood particles, and the ambient humidity and temperature, the circuit of FIG. 9 is arranged to adaptively modify the supplied shutdown compensation signal based on the accuracy of the shutdown compensation control signal generated to compensate for a previous shutdown period. As shall be discussed, in this arrangement when production is resumed after each shutdown period the first mat produced by the formers is compared with the target weight and the weight difference utilized to adaptively control the operation of the shutdown compensation controller during the next shutdown period. Thus, if the first mat produced when the system begins to operate again, is heavier than the target weight, the shutdown compensation controller is adaptively controlled to supply a greater decrease in former speed after the next shutdown period. Similarly, if after a first shutdown period the weight of the first mat produced is less than the target weight, the shutdown compensation controller will be adaptively controlled to proportionately increase the former speed signal supplied after the next shutdown period.

The circuit of FIG. 9 can best be understood by first neglecting the adaptive control action. In FIG. 9, a shutdown sensor 350 is connected to a terminal 352 that is arranged to receive a signal proportional to the speed of the conveyor 12 of FIG. 1. For example, terminal 352 can be connected to the output terminal of the filter 200 of the line speed control circuit depicted in FIG. 4. The shutdown sensor 350 is arranged to supply a binary signal having a logic level of one as the conveyor 12 ceases to move (or moves at a rate below a preselected speed) and a binary signal of a logic level zero whenever the conveyor 12 is moving. Various conventional circuits can be employed to realize a suitable shutdown sensor 350. For example, the shutdown sensor 350 can be a conventional digital counter that is connected to trigger a multivibrator or switch circuit only when the counter contains a count of zero.

In any case, the output signal supplied by the shutdown sensor 350 is supplied to the input terminal of an exponential filter 354, to a sample and hold circuit 356, to a gate circuit 408, and also to an adaptive shutdown controller 358. It should be noted that to control the master and follower speeds of each former 20–26 of FIG. 1, separate circuits depicted within the dashed outline 362 of FIG. 9 are required with each circuit 362 being associated with one of the masters or one of the followers.

The input of the sample and hold circuit 356 is connected to a terminal 360 which is in turn connected to the output of one of the former control accumulators 80 of FIG. 1. When the manufacturing system of FIG. 1 ceases to operate, the sample and hold circuit of 356 responds to the signal supplied by the shutdown sensor 350 by storing the digital signal then being produced by the associated accumulator 80. This signal is coupled to the additive input of a subtractor 364 and one input of a multiplier 366. The output of the multiplier 366 is connected to the subtractive input of the subtractor 364 and the output of the subtractor 364 is connected to one input of a multiplier 368 and to the additive input of a subtractor 370. The output of the multipiler 368 is coupled to the subtractive input of the subtractor 370 and the output of the subtractor 370 is coupled to a terminal 372. The terminal 372 is connected to the terminal 83 of an associated gate 79 of FIG. 1. As described relative to the particleboard manufacturing system of this invention depicted in FIG. 1, each gate 79 supplies the shutdown compensation signal to the former speed control 84 of an associated master or follower of one of the formers 20–26. In addition, one input terminal of the multiplier 366 is connected to the output terminal 374 of the adaptive shutdown controller 358 and the output of the filter 354 is connected to one input of the multiplier 368.

By examining the described circuit, it can be seen that whenever the manufacturing system is shut down and the shutdown sensor 350 couples a signal of a logic level 1 to the filter 354 then the output of the circuit 362 at terminal 372 is $T[I\text{-}F(Ie^{-kt})]$, where T is the command signal being supplied to the associated former speed control circuit 84 by the accumulator 80 at the time the manufacturing system was shut down, F is a value established by the adaptive shutdown controller 358 at the terminal 374, *e* is the base of the system of natural logarithms, *k* is a time constant internally established within the filter 354 and *t* is the duration of the shutdown period. Thus, it can be seen that the circuit 362 supplies a former speed control signal to the terminal 372 which exponentially decreases according to the duration of the shutdown period. Although utilization of this circuit without the adaptive control of the factor F provides fairly satisfactory operation, it has been found that controlling the factor F based on the degree of success achieved after the previous shutdown period is desirable.

Since the gate circuit 79 of FIG. 1 will reconnect the input of each former speed control 84 to the output of the associated accumulator 80 when the shutdown period ends, the digital number stored in each accumulator 80 must be decreased in value to reflect the former speed command signal supplied by the shutdown compensation controller. In the arrangement of FIG. 9 the shutdown compensation signal supplied at each terminal 372 is coupled to the additive input of an associated subtractor 402. The subtractive input of each subtractor 402 is connected to a terminal 406, arranged to receive a signal representing the value stored in the associated accumulator 80 at the commencement of the shutdown period, e.g., the signal supplied by the sample and hold circuit 356. The output of the subtractor 402, which supplies a signal representing the desired amount of former speed change when production resumes is connected to the input of a gate circuit 408.

The gate circuit 408, which like the gate 79 of FIG. 1 can be a conventional addressable data port, is arranged to couple the output of the subtractor 402 to a terminal 404 whenever the signal supplied by the shutdown sensor 350 is of a logic level zero. The terminal 404 is connected to the input terminal of the associated accumulator 80 of FIG. 1 such that the output signal supplied by the subtractor 402 will be subtracted from the value currently stored in the accumulator.

As previously mentioned, the factor F is controlled in response to the difference between the actual weight and the target weight of the first mat produced by the manufacturing system when production commences after a shutdown period. In this respect, it has been determined that a suitable factor F is $$F = F + FG\,(MW - TW)TW$$

where F′ is the factor F utilized during the previous shutdown period, G is a gain constant, and TW and MW are respectively the target weight and the measured weight of the first mat produced when the production commenced.

In the adaptive shutdown controller 358 of FIG. 9, the signal representing the measured weight of each mat 32 that reaches the gross scale 38 of the manufacturing system of FIG. 1 is coupled to a terminal 378 which is connected to the additive input of the subtractor 380. The target weight, which as previously described is entered by the system operator, is connected to a terminal 376 that connects to the subtractive input of the subtractor 380 and also connects to one input of a divider 382. The output of the subtractor 380 is connected to the second input of the divider 382 and the outpu of the divider 382 is connected to a multiplier 384. The second input of the multiplier 384 is connected to the terminal 374 which as previously stated supplies the factor F. The output of the multiplier 384 is connected to the second input of the multiplier 386 and the output of the multiplier 386 is connected to the input of a gate circuit 390. The gain factor G of the equation defining the factor F is supplied as a digital signal that is coupled to a terminal 388 that is connected to the second input of the multiplier 386. The gate circuit 390 is a conventional logic circuit arrangement, such as a circuit identical to the gates 408, which couples the signals supplied by the multiplier 386 to the input of an accumulator circuit 392 whenever a suitable logic signal is provided to the gate from a counter 394.

The counter 394 and the multiplier 396 are arranged to provide a gate signal to the gate circuit 390 when the first mat that is deposited by the former upon the commencement of production after a shutdown period reaches the gross scale 38. In particular, when the system is shut down the shutdown sensor 350 couples the signal of logic level one to one input terminal of the multiplier 396. The second input terminal of the multiplier 396 is connected to a terminal 398 which is supplied with a digital number representing the number of cauls between the first former 20 of FIG. 1 and the gross scale 38. Thus, the output of the multiplier 396 is numerically equal to the number of cauls that must pass over the gross scale 38 before the desired mat 32 arrives. This signal is used to preset the counter 394 at the time at which the system ceases to operate. A terminal 400 of the counter 394 is connected to receive a pulse signal each time a caul 10 and mat 32 reach the gross scale 38. This signal can be supplied by a variety of means, for example, a monostable multivibrator activated by each weight signal supplied by the mat weighing system 62 of FIG. 1.

As each pulse signal reaches the counter 394 in coincidence with the arrival of each mat 32 at the gross scale 38, the counter decrements the count by one unit. Thus when the first mat deposited after the system was reactivated the counter reaches a count of zero and momentarily activates the gate 390. When the gate 390 is activated, the signal supplied by the multiplier 386, in response to the first mat produced, is coupled to an accumulator 392. The accumulator 392 adds the arriving signal to the value of F that was used during that shutdown period and hence stores a new value of F (as given by above stated equation) for use during the next shutdown period.

It will be recognized by those skilled in the art that the embodiments described herein are exemplary in nature and that many variations can be made therein without departing from the scope and the spirit of this invention. For example, it will be recognized that a great variety of logic circuits can be arranged to be structurally equivalent to those embodiments herein described. As is true in a large number of digital control systems wherein many of the required circuits effectively perform a digital calculation, it is often advantageous to embody digital computing apparatus within the control system. Such digital computing apparatus is known in the art and can include general-purpose machines, programmed to perform necessary operations, or can include microprocessor equipment permanently interconnected to perform the necessary operations. As is known in the art, the advantages of utilizing such digital computing apparatus includes eliminating much of the digital circuitry otherwise required and extends the system flexibility in that changes in various performance parameters can often be made both quickly and easily. Further, in such an arrangement a substantial amount of useful information concerning the system operation can be formulated. For example, a record can be kept of the weights of the mats being produced, the weight deviation from the target weight, and the ratio of acceptable to unacceptable mats that has been (or is currently being) produced. Such information is valuable not only for record keeping reasons, but can also be utilized for continued analysis of the control system and possible updating of the various control parameters, e.g. the constants which determine the action to be taken by the manufacturing system and the speed at which the manufacturing system is to respond.

Those skilled in the art will recognize that such digital computing apparatus can be included within this invention by a variety of different arrangements. Further, those skilled in the art will recognize from the disclosed embodiments and the disclosed mathematical relationships involved in the practice of this invention, those interconnections of prior art computing apparatus that are necessary to realize such an embodiment. It should be pointed out however that, in such an embodiment, the mat weight control is preferably effected on an interrupt basis as each mat reaches the gross scale. Production rate control, grade change control, and shutdown compensation can each be effected by utilizing the parameters such as the information entered by the system operator via the system interface unit and the conveyor speed as indicators or "flags" and causing the digital computing apparatus to periodically determine whether such indicators are activated.

In addition, those skilled in the art will recognize that, although the disclosed embodiment is a digital control system, an equivalent analog control system can be readily realized.

What is claimed is:

1. In a particleboard manufacturing system wherein mats having a predetermined length and width dimension are formed on a moving conveyor by a plurality of formers arranged to deposite a volume of resin coated wood particles for forming a web of loosely bonded wood particles, said web being trimmed to form said mats, the speed of said conveyor and the volume of said wood particles deposited by each of said formers being controllable by electrical signals to thereby establish the weight of each of said mats, the improvement comprising:

weight control means for automatically controlling the weight of each mat produced by said manufacturing system, said weight control means including means for detecting the weight of each of said mats; means for detecting the weight error between the weight of each of said mats and a predetermined target weight, prediction means for determining a predicted weight error for each of said mats being produced by said system, said prediction means responsive to the difference between said weight error and said predicted error for each of said mats supplied by said manufacturing system; means for determining said difference between said weight error and said predicted error; signal conditioning means responsive to said difference between said weight error and said predicted weight error of each of said mats, said signal conditioning means supplying a control signal having a predetermined mathematical relationship with said difference between said weight error and said predicted weight error of each of said mats; and means responsive to said control signal for supplying said electrical signals to at least one of said formers to control the weight of said mats.

2. The particleboard manufacturing system of claim 1 wherein said improvement further comprises adaptive control means responsive to said weight error for adaptively controlling the response of said signal conditioning means, said adaptive control means including means for altering said predetermined mathematical relationship between said control signal and said difference between said weight error and said predicted weight error whenever said weight error exceeds a predetermined value.

3. The particleboard manufacturing system of claim 2 wherein said predetermined mathematical relationship between said control signal and said difference between said weight error and said predicted weight error is equal to a predetermined number added to the product of the present conveyor speed of said manufacturing system and a multiplicative factor.

4. The particleboard manufacturing system of claim 3 wherein said adaptive control means controls the value of said predetermined number, said adaptive control means reducing the value of said predetermined number whenever said weight error exceeds said predetermined value and increasing said value of said predetermined number to a predetermined constant when said control system causes said weight error to become less than said predetermined value.

5. The particleboard manufacturing system of claim 1 wherein said mats are deposited on cauls as the cauls move beneath said formers, each of said cauls and the mat contained thereon passing over a first scale for supplying a gross weight signal, said means for determining the weight of each of said mats including:

a second scale for supplying a caul weight signal, said second scale being located along said conveyor at a position reached by said cauls before said cauls pass beneath the first one of said formers; and means for determining the difference between said gross weight signal and said caul weight signal as each of said cauls and the mat contained thereon reach said first scale.

6. The particleboard manufacturing system of claim 5 wherein said means for determining said weight error between the weight of each of said mats and said predetermined target weight includes means for comparing said signal indicative of said weight of each mat with said predetermined target weight as each of said cauls reach said first scale.

7. The particleboard manufacturing system of claim 1 wherein the speed of said conveyor is controllable by electrical signals and said improvement further comprises production rate control means for controlling the weight of each of said mats when electrical signals are supplied to said conveyor to alter the production rate of said particleboard manufacturing system, said production rate control means including means for supplying electrical signals to at least one of said formers to change the volume of said wood particles deposited thereby in inverse proportion to incremental changes in the speed of said conveyor.

8. The particleboard manufacturing system of claim 1 wherein the speed of said conveyor is controlled by electrical signals and said improvement further comprises grade change control means for automatically supplying said electrical signals for controlling said conveyor speed when said manufacturing system begins the manufacture of a new grade of particleboard, said grade change control means including means for supplying a signal directly proportional to a current speed of said conveyor, the ratio between the area of those mats to be supplied for said new grade and the area of those mats supplied prior to the manufacture of said new grade, and the ratio between the target weight for said mats being supplied prior to said manufacture of said new grade and the target weight for said mats to be produced for said new grade.

9. The particleboard manufacturing system of claim 1 wherein said improvement further comprises shutdown compensation means for supplying said electrical signals to at least one of said formers to decrease the volume of wood particles deposited thereby when operation of said manufacturing system is commenced following an interruption in operation, said shutdown compensation means including means for supplying said signal to said formers with a magnitude related to that electrical signal supplied by said weight control means at the time of said interruption in production and an exponential function of the time duration of said production interruption.

10. The improvement of claim 9 wherein said shutdown compensation means further includes means for adaptively determining said signal on the basis of the difference between a target weight and the weight of the first mat supplied by said formers following a previous production interruption.

11. Process control apparatus for controlling a particleboard manufacturing system wherein mats having a predetermined length and width dimension are formed on metal cauls moving along a conveyor and transported beneath a series of formers for depositing a volume of wood particles, the speed of said conveyor and the volume of wood particles deposited by each of said formers being controllable by electrical signals, said process control apparatus comprising:

weight determining means for supplying a first signal representative of the weight of each of said mats deposited by said formers of said particleboard manufacturing system as each of said cauls reaches a predetermined point along said conveyor;

first subtractor means for supplying a second signal representative of the difference between th weight of each of said mats and a predetermined target weight;

second subtractor means responsive to said second signal and an applied third signal for supplying a fourth signal representative of the difference between said second and third signals, said second subtractor means supplying said fourth signal each time one of said mats causes said weight determing means to supply said first signal;

transfer function means responsive to said fourth signal for supplying a control signal to control the rate at which at least one of said formers deposits said wood particles, said transfer function means supplying said control signal in accordance with a predetermined algebraic expression; and predictor means for supplying said third signal to said second subtractor means, said predictor means including means for storing a predetermined number of values representative of the desired response of said manufacturing system to said control signal supplied by said transfer function means, means for supplying said values as scaler portions of each of said fourth signals, and means for supplying said third signal as an accumulated sum of all previously supplied third signals and the difference between the current fourth signal and one of said stored values.

12. The process control apparatus of claim 11, wherein said predictor means comprises:

divider means for supplying a signal numerically equal to each of said fourth signals divided by a divisor factor that is numerically equal to the number of cauls that can be simultaneously positioned beneath said formers;

storage means having a number of consecutive storage locations equal to the number of cauls that can be positioned between the point of said conveyor at which the first one of said formers deposits wood particles and said predetermined point along said conveyor;

means for sequentially shifting each of those values stored in said storage locations of said storage means to the nextmost storage location of said consecutive storage locations, said values being shifted each time said weight determining means supplies one of said first signals, the value previously contained in the last one of said storage locations being shifted from said storage means;

means for coupling said signal supplied by said divider means to a number of storage locations of said storage means that is equal to said divisor factor of said dividing means, said signal being coupled to said storage locations after said values have been shifted, said signal inserted in the first one of said storage means and being added to any value contained in each remaining storage location that receives said signal supplied by said dividing means; and accumulator means responsive to the difference between a currently supplied one of said fourth signals and that value shifted from said storage means when said values are shifted within said storage means by one storage location, said accumulator accumulating a presently held value with said difference each time said weight determining means supplies said first signal, said accumulator means supplying a signal representative of said accumulated value as said third signal.

13. The process control apparatus of claim 11, further comprising adaptive control means for establishing said predetermined algebraic expression of said transfer function means, said adaptive control means responsive to said second signal supplied by said first subtractor means for decreasing th magnitude of said control signal supplied by said transfer function means whenever said second signal exceeds a predetermined magnitude.

14. The process control apparatus of claim 13, wherein said predetermined algebraic expression is of the form $AS + B$ where A is a constant, S is the speed of said conveyor and B is a numerical value supplied by said adaptive control means.

15. The process control apparatus of claim 14, wherein said adaptive control means comprises:

means for exponentially filtering each of said second signals to supply a filtered signal;

means for subtracting said filtered signal from said second signal to supply a first difference signal;

means for determining the absolute value of said first difference signal to supply a first absolute value signal;

means for determining the absolute value of said filtered signal signal to supply a second absolute value signal;

means for subtracting said first absolute value signal from said second absolute value signal to supply a second difference signal; and means for accumulating each of said second difference signals as said second signals are supplied by said first subtractor means, said accumulated signal being supplied to said transfer function means to determine said numerical value of B.

16. The process controller of claim 11, further comprising production rate control means for changing the rate at which said manufacturing system produces said mats from a present rate to a desired rate, said production rate control means including:

means for supplying an electrical signal of predetermined magnitude to said conveyor to alter the speed of said conveyor whenever the difference between said desired rate and said present rate exceeds a predetermined value; and means for supplying an electrical signal to at least one of said formers whenever the speed of said conveyor changes, said means for supplying said electrical signal to said former including means for dividing a present conveyor speed by the conveyor speed at an earlier predetermined time to supply a quotient signal, means for multiplying said quotient signal by the control signal supplied by said transfer function means to supply a product signal, means for subtracting said control signal supplied by said transfer function means from said product signal to supply a correction signal;

said process controller further comprising means for summing said correction signal with said signal supplied by said transfer function means.

17. The process controller of claim 16 wherein said means for supplying said electrical signal to said conveyor includes means for multiplying the electrical signal presently being supplied to said conveyor by a factor proportional to the volume of the particleboard to be formed from each of said mats to supply a signal corresponding to the present production rate, means for subtracting said signal corresponding to said production rate from said desired production rate to supply a production rate difference signal, means for supplying an electrical signal that accelerates said conveyor at a predetermined rate when said production rate difference signal is positive and exceeds a predetermined value, and means for supplying an electrical signal that decelerates said conveyor at said predetermined rate when said production difference signal is negative and of a magnitude that exceeds said predetermined value.

18. The process control apparatus of claim 17 wherein said means for supplying said signal to at least one of said formers comprises:

means for storing said signal presently supplied to said conveyor to supply a delayed speed signal having a predetermined time relationship with each of said signals presently being supplied;

means for dividing each of said presently supplied conveyor speed signals by said delayed signal to supply a line speed ratio signal;

means for multiplying said line speed ratio signal by the signal presently being supplied to each of said formers to supply a product signal;

means for subtracting said signal presently being supplied to said formers from said product signal to supply a former correction signal;

said process control apparatus further comprising means for accumulating said former correction signal with said control signal supplied by said transfer function means.

19. The process control apparatus of claim 11, further comprising grade change means for supplying said electrical signal for controlling said conveyor whenever said particleboard manufacturing system begins to manufacture a second grade of particleboard after first manufacturing a first grade of particleboard, said first and second grades of particleboard each having mats of first and second area and each having a first and second target weight, said grade change means including:

means for dividing the mat area of said second grade of particleboard by the mat area of said first grade of particleboard to form an area ratio;

means for dividing said target weight of said first grade of particleboard by the target weight of said second grade of particleboard to supply a target weight ratio;

means for multiplying said target weight ratio by said area ratio to supply a line speed ratio;

means for multiplying said line speed ratio by the signal currently controlling the speed of said conveyor to supply a product signal;

means for subtracting said signal currently controlling said conveyor speed from said product signal to supply a speed difference signal; and means for accumulating said speed difference signal with said signal being supplied to said conveyor to alter said electrical signal supplied to said conveyor.

20. The process control apparatus of claim 11, further comprising shutdown compensation means for decreasing said electrical signals supplied to at least one of said formers following an interruption in the production of said mats, said shutdown compensation means including:

means for determining the control signa being supplied at the time of said production interruption to each of said formers that are to be supplied with said shutdown compensation signal;

means for multiplying said control signals at said time of production interruption by a predetermined factor F to supply a first product signal for each of said formers to be supplied with said shutdown compensation signal;

means for subtracting said control signal being supplied at said time of said production interruption from said first product signal to supply a first difference signal for each of said formers to be supplied said shutdown compensation signal;

means for supplying an exponential signal $e^{-kt}$, where e is the base of the system of natural logarithms, k is a predetermined constant and t is the time duration of said production interruption;

means for multiplying said first difference signal by said exponential signal to supply a second product signal;

means for subtracting said second product signal from said difference signal to supply a desired speed signal for each of said formers to be supplied said shutdown compensation signal;

means for subtracting each of said control signals at said time of production interruption from the corresponding one of said desired speed signals to supply said shutdown compensation signal for each of said formers to be supplied with said shutdown compensation signal;

said process control apparatus further comprising accumulation means for accumulating each said shutdown compensation signals for each of said formers to be supplied said shutdown compensation signal with said control signal supplied that former at the time said production interruption occurred.

21. The process apparatus of claim 20, further comprising means for adaptively determining said predetermined factor F on the basis of the difference between a target weight and the weight of the first one of said mats produced when said manufacturing system was activated following a previous production interruption, said adaptive determining means including:

accumulator means for adding a present value of the factor F used in supplying said shutdown compensation signal for a present production interruption with an adaptive value supplied to said accumulator means, said accumulator supplying a signal representative of a new value of said factor F for use during the next period of production interruption;

means for multiplying said present value of F by said weight deviation ratio signal to supply a third product signal;

means for multiplying said third product signal by a predetermined scaler portion of said present value of said factor F to supply said adaptive value to said accumulator; and means for supplying said signal representative of said new value F to said means for multiplying said control signal at said time of interruption by said value of F.

* * * * *

UNITED STATES PATENT AND TRADEMARK OFFICE

CERTIFICATE OF CORRECTION

PATENT NO. : 4,038,531

DATED : July 26, 1977

INVENTOR(S) : Alton L. Loe, Jr.

It is certified that error appears in the above-identified patent and that said Letters Patent are hereby corrected as shown below:

Claim 1, Column 35, line 42, delete "deposite" and insert therefor —deposit—.

Claim 11, Column 37, line 47, delete "th" and insert therefor —the—.

Claim 13, Column 38, line 55, delete "th" and insert therefor —the—.

Signed and Sealed this

*Eleventh* Day of *October 1977*

[SEAL]

*Attest:*

RUTH C. MASON
*Attesting Officer*

LUTRELLE F. PARKER
*Acting Commissioner of Patents and Trademarks*